United States Patent
Shioya

(10) Patent No.: US 8,493,480 B2
(45) Date of Patent: Jul. 23, 2013

(54) IMAGE CAPTURING METHOD AND APPARATUS FOR EFFICIENTLY PROCESSING A DIGITAL IMAGE

(75) Inventor: Hiroyuki Shioya, Kanagawa (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 12/901,203

(22) Filed: Oct. 8, 2010

(65) Prior Publication Data

US 2011/0096184 A1    Apr. 28, 2011

(30) Foreign Application Priority Data

Oct. 28, 2009   (JP) ................................ P2009-247224
Aug. 30, 2010   (JP) ................................ P2010-192141

(51) Int. Cl.
*H04N 5/202*    (2006.01)
(52) U.S. Cl.
USPC .......................................... 348/254; 382/274
(58) Field of Classification Search
None
See application file for complete search history.

(56) References Cited

U.S. PATENT DOCUMENTS 3,716,849 A * 2/1973 Metcalf .......................... 341/158
2004/0201757 A1* 10/2004 Okada ............................ 348/241

FOREIGN PATENT DOCUMENTS

JP          2548005      8/1996

* cited by examiner

*Primary Examiner* — Nelson D. Hernández Hernández
*Assistant Examiner* — Dennis Hogue
(74) *Attorney, Agent, or Firm* — Finnegan, Henderson, Farabow, Garrett & Dunner, L.L.P.

(57) ABSTRACT

A signal conversion apparatus which converts an input signal x from an image sensor into an output signal y by a function relation represented by Expression 1:

$$y = f(x) = \int_b^x [1/r(\xi)] d\xi \tag{1}$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

13 Claims, 34 Drawing Sheets

C=1/2

C=1/3

C=1/4

C=1/8

IMAGE CAPTURING METHOD AND APPARATUS FOR EFFICIENTLY PROCESSING A DIGITAL IMAGE

BACKGROUND OF THE INVENTION

1. Field of the Invention

The present invention relates to a signal processing apparatus, a signal processing method, a computer program, an image processing apparatus, and an image capturing apparatus processing a signal of an image captured by an image sensor such as a CCD or a CMOS, and more particular, to a signal processing apparatus, a signal processing method, a computer program, an image processing apparatus, and an image capturing apparatus processing the signal of a RAW image which is not processed particularly in a de-mosaic process or the like.

2. Description of the Related Art

In recent years, digital cameras performing digital coding on images captured by an image sensor such as a CCD (Charge Coupled Device) or a CMOS (Complementary Metal-Oxide Semiconductor) have come into wide use, instead of silver salt cameras photographing an image using a film or a photographic plate. The digital cameras have the advantage of having no life problem of a film since the digital cameras can store images subjected to digital coding in a memory and can process or manage the images with a computer.

Both the CCD image sensor and the CMOS image sensor also have a configuration in which pixels (photodiodes) arranged in a 2-dimensional form convert light into charges using the photoelectric effect. In numerous digital cameras, since a single plate type color is used, only single color information is used among color information on red (R), green (G), and blue (B) in each pixel. Therefore, a "de-mosaic" process has to be performed to obtain a full color image by collecting insufficient color information from peripheral pixels for each pixel when an image is photographed and by interpolating the color information. Then, the completed image is compressed in conformity with a general image format such as JPEG (Joint Photographic Expert Group) or TIFF (Tag Image File Format) and is stored.

However, the precision of the de-mosaic process has a great influence on the image quality of the completed image. Moreover, since a white balance (color temperature) or the like of the image subjected to the de-mosaic process is fixed, correction may not be performed easily. Since an image recording format such as JPEG is supposed to be processed after image-processed data is input, the image recording format may not be used for recording the signal of a RAW image. Therefore, a function of storing, as a file, the signal (that is, the output signal of an image sensor) of the RAW image which is not subjected to the de-mosaic process is necessary mainly in high-performance cameras. Since the signal of the RAW image is generally subjected to non-compression or reversible compression, the signal of the RAW image has a very large file size, compared to JPEG. However, when the RAW image can be suppressed so as to have the same file size as that of JPEG with high quality (see FIG. 15), the function of a camera is improved and thus competitiveness is improved in the market. Comparison between a RAW image and a JPEG image is shown in the following table.

TABLE 1

| | ADVANTAGES | DISADVANTAGES |
|---|---|---|
| RAW | NON-APPLICATION OF IMAGE PROCESSING, LARGE DEGREE OF FREEDOM | RELATIVELY LARGE SIZE |
| JPEG | SMALL SIZE, IMMEDIATELE DISPLAY | RECOVERY IS DIFFICULT AFTER IMAGE PROCESSING |

In an image compression method such as JPEG, the amplitude of an image signal is converted into a frequency space using DCT and an amount of information is reduced based on the characteristics of the sense of vision. On the other hand, a method of compressing the signal of the RAW image on the focus of a noise of data was suggested in the past.

For example, there was suggested a signal conversion apparatus cutting off and quantizing an alternating current component with an amplitude equal to or smaller than an average amplitude (hereinafter, referred to as a "noise level") of a noise (for example, see Japanese Patent No. 2548005). An output signal x from an image sensor is the number of electrons (that is, discrete value) corresponding to lightness and the noise level is varied depending on the number of electrons. Specifically, since the noise increases with an increase in the lightness, the noise level also increases. In the signal conversion apparatus, an output signal y determined by Expression 1 can be obtained for the image signal x.

$$y = f(x) = c \int_{b}^{x} [1/n(\xi)] d\xi \qquad (1)$$

In Expression 1, $\xi$ is an integration variable corresponding to the value of the input signal x, $n(\xi)$ is a standard deviation (average amplitude) of a noise superimposed in an input signal which is expressed as a function of the integration variable $\xi$, b is a signal voltage (constant) when the lightness is 0, and c is a predetermined constant value. In Expression 1, a noise level $n_y$ of y is a constant independent of y, as expressed in Expression 4, when the noise occurring in the signal conversion apparatus can be ignored for the entire noise contained in y. Therefore, when the signal y is quantized in the next stage, LSB (Least Significant Bit) is quantized to correspond to c of Expression 4 and thus a digital signal y is obtained. At this time, the capacity necessary in a transmission path of the output signal y is smaller than the capacity necessary in a transmission path of the input signal x.

$$n_y = (dy/dx)n = c \qquad (2)$$

To increase a compression ratio of the signal of the RAW image, the constant c may be decreased in Expression 1. That is, the amount of data can be reduced by decreasing the constant c. However, the decrease in the amount of data sacrifices image quality. Moreover, when the constant c is decreased, unnatural gray scales may be noticeable in the image subjected to signal converting. Japanese Patent No. 2548005 does not disclose this phenomenon. Moreover, since occurrence of the unnatural gray scales may not be predicted, the unnatural gray scales have to be adjusted based on experience.

In FIGS. 16A to 16D, the result obtained by performing signal converting on an image sample by Expression 1 as varying the constant c is shown. It can be observed that the unnatural gray scales appear with the decrease in the constant c. FIG. 17 shows a luminance distribution in which the same image sample gradually varies from lightness to darkness when the same image sample is subjected to integralization in the luminance direction and is further subjected to smoothing. Here, the horizontal axis represents position and the vertical axis represents luminance. As shown in FIG. 17, it is understood that the very small constant c in Expression 1 may cause the unnatural gray scales (solarization).

SUMMARY OF THE INVENTION

It is desirable to provide a signal processing apparatus, a signal processing method, a computer program, an image processing apparatus, and an image capturing apparatus capable of satisfactorily processing the signal of a RAW image photographed by an image sensor such as a CCD or a CMOS.

It is desirable also to provide a signal processing apparatus, a signal processing method, a computer program, an image processing apparatus, and an image capturing apparatus capable of satisfactorily improving the efficiency of the entire image compression process by converting the signal of a RAW image.

According to a first embodiment of the present invention, there is provided a signal conversion apparatus which converts an input signal x from an image sensor into an output signal y by a function relation represented by Expression 3.

According to a second embodiment of the present invention, in the signal conversion apparatus according to the first embodiment of the invention, the input signal x is a signal voltage corresponding to the number of electrons in response to lightness, b is a signal voltage when the lightness is 0, and a standard deviation of a noise superimposed in the input signal x is dependent on the value of the input signal x.

According to a third embodiment of the present invention, in the signal conversion apparatus according to the first embodiment of the invention, the output signal y is a quantized digital signal so that LSB corresponds to 1 or a value equal to or smaller than 1. A function r(x) is a quantization step function before the removal of a noise which determines Expression 3 described below so that a difference between an expectation value of a non-quantized signal and an expectation value of a quantized signal is decreased.

Specifically, according to a fourth embodiment of the present invention, the quantization step function r(x) in integralization before the removal of a noise is represented by Expression 6 described below and Expression 6 can be obtained under a constraint condition presented by Expression 7 described below. According to a fifth embodiment of the present invention, a quantization step function R(x) for the removal of the noise of the input signal x which determines an increment of the input signal x to the increment of the gray scale of image data from which the noise is removed by a development process can be obtained based on a tone curve Y(x) used in the subsequent image process.

According to a sixth embodiment of the present invention, in the signal conversion apparatus according to the first embodiment of the invention, the function r(x) in Expression 3 described below can be substituted as in Expression 11. In this expression, r'(x) is r(x) in Expression 2 and q(x) is a predetermined function.

According to a seventh embodiment of the present invention, in the signal conversion apparatus according to the sixth embodiment of the invention, the function q(x) is represented by Expression 14 described below. In this expression, n(x) is a function indicating the intensity of the noise depending on the intensity of the signal and c is a predetermined constant.

According to an eighth embodiment of the present invention, there is provided a signal conversion method of converting an input signal x from an image sensor into an output signal y by a function relation represented by Expression 3 described below.

According to a ninth another embodiment of the present invention, there is provided a computer program causing a computer to convert an input signal x from an image sensor into an output signal y by a function relation represented by Expression 3 described below.

The computer program according to the ninth embodiment of the invention defines a computer program described in a computer readable format to realize a predetermined process on the computer. In other words, by installing the computer program according to the ninth embodiment of the invention in the computer, a cooperative operation is realized on the computer and thus the same operational advantage as that of the signal conversion apparatus according to the first embodiment of the invention can be obtained.

According to a tenth embodiment of the present invention, there is provided an image processing apparatus including: a signal processing unit which converts a digital voltage signal $a=A(v)$, which is obtained through digital conversion performed on a voltage signal $v=V(x)$ including a signal voltage corresponding to the number x of photons output from an image sensor, into the number $x=V^{-1}(A^{-1}(a))$ of electrons generated in the image sensor, and which then performs non-linear conversion $k=f(x)$ by a function relation represented by Expression 3 described below and performs non-linear reverse conversion to the number $x=V^{-1}(k)$ of electrons; and an image processing unit which obtains an image signal $y=Y(x)$ by performing an image process other than de-mosaic on a RAW image signal, which is formed by the number x of electrons subjected to the non-linear reverse conversion, using a predetermined tone curve Y(x).

According to an eleventh embodiment of the present invention, there is provided an image capturing apparatus including: a sensor unit converting the number x of photons of incident light into a voltage signal; an AD converter converting the voltage signal into a digital value; a non-linear conversion unit performing non-linear conversion to convert the number x of electrons corresponding to a digital voltage signal by a function relation represented by Expression 5 described below; a recording unit recording a digital non-linear signal y; a non-linear reverse conversion unit performing reverse conversion on the digital non-linear signal y to obtain a RAW image signal corresponding to the number x of electrons; an image processing unit performing an image process other than de-mosaic on the RAW image signal using a predetermined tone curve Y(x) to obtain an image signal $y=Y(x)$; and a display unit displaying and outputting the image signal y.

According to a twelfth embodiment of the present invention, there is provided an image capturing apparatus including: a sensor unit converting the number x of photons of incident light into a voltage signal; a non-linear AD converter performing non-linear conversion to convert the number x of electrons corresponding to the voltage signal by a function relation represented by Expression 5 described below and converting the number x of electrons into a digital value; a recording unit recording a digital non-linear signal y; a non-linear reverse conversion unit performing reverse conversion on the digital non-linear signal y to obtain a RAW image signal corresponding to the number x of electrons; an image processing unit performing an image process other than de-mosaic on the RAW image signal using a predetermined tone curve Y(x) to obtain an image signal $y=Y(x)$; and a display unit displaying and outputting the image signal y.

According to a thirteenth embodiment of the present invention, there is provided an image capturing apparatus including: a sensor unit converting the number of photons of incident light into a voltage signal; an AD converter converting the voltage signal into a digital value; a non-linear conversion unit performing non-linear conversion to convert the number x of electrons corresponding to a digital voltage signal by a function relation represented by Expression 5 described below; a recording unit recording a digital non-linear signal y; an image processing unit performing reverse conversion on the digital non-linear signal y to obtain a RAW image signal corresponding to the number x of electrons and performing an image process other than de-mosaic using a predetermined tone curve Y(x) to obtain an image signal y=Y(x); and a display unit displaying and outputting the image signal y.

According to the embodiments of the invention, there are provided the signal processing apparatus, the signal processing method, the computer program, the image processing apparatus, and the image capturing apparatus capable of performing the signal conversion process on the RAW image to realize the compression of data and a decrease in the capacity of a transmission path, thereby improving the efficiency of the entire image compression process.

According to the embodiments of the invention, the signal conversion process can be performed based on the gray scales of lightness of the image data obtained after development, thereby compressing the image without generating an unnatural gray scale. Moreover, the signal conversion process can be performed appropriately without dependency on adjustment based on experience.

The other features and advantages of the embodiments of the invention will be apparent from the following detailed description of embodiments of the invention and the accompanying drawings.

DESCRIPTION OF THE PREFERRED EMBODIMENTS

Hereinafter, an embodiment of the invention will be described in detail with reference to the drawings.

The embodiment of the invention relates to a signal processing apparatus and a signal processing method of performing non-linear quantization on an output signal of an image sensor, and it is desirable to realize the compression of data or a decrease in the capacity of a transmission path.

In the embodiment of the invention, Expression 3 is suggested as a signal conversion expression for performing non-linear quantization on the output signal of the image sensor.

$$y = f(x) = \int_b^x [1/r(\xi)]d\xi \quad (3)$$

$$\tilde{y} = \lfloor y+q \rfloor \quad (4)$$

$$(x) = f^{-1}(\tilde{y}+0.5-q) \quad (5)$$

In Expression 3, a function $r(\xi)$ is "a quantization step function before removal of a noise of an input signal x determining an increment of the input signal x to an increment of an output signal y" obtained in advance. The function $r(\xi)$ substitutes for the noise average amplitude $n(\xi)$ of Expression 1 described above. The constant c used in Expression 1 is excluded in Expression 3. Pixel data actually recorded in a memory has a value rounded off by Expression 4. That is, the quantization is performed so that LSB corresponds to 1 by Expression 4. The pixel data read from the memory becomes an original RAW image signal according to Expression 5. In this expression, q is a constant that determines a threshold value for rounding down and rounding up a value when the value is rounded off. A random variable including an appropriate jitter of which an average value is 0.5 may be used instead of the value 0.5 in Expression 5.

By performing the non-linear quantization on the output signal of the image sensor appropriately accordingly to Expression 5, the compression of the image data or a decrease in the capacity of the transmission path can be realized without causing unnatural gray scales. In order to realize the compression of the image data and the decrease in the capacity of the transmission path, it is necessary to appropriately calculate the quantization step function r(x) before removal of a noise of the input signal x determining an increment of the input signal x to an increment of the output signal y.

Figure 1:
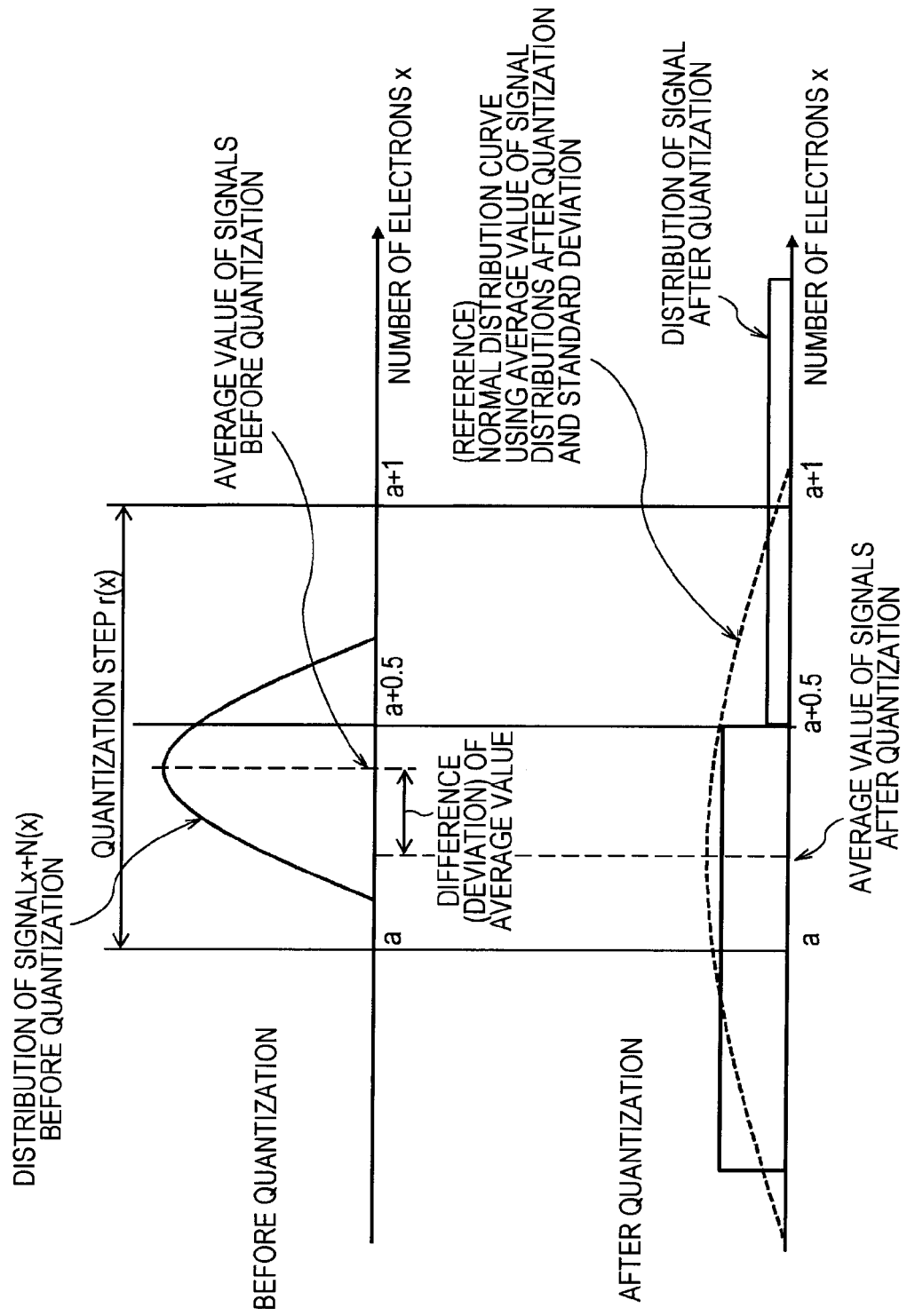
FIG. 1 is a diagram illustrating a method of determining a quantization step function r(x) before the removal of a noise of an input signal x determining an increment of the input signal x to an increment of an output signal y, just as the difference between an average value of signals before quantization and an average value of noises of the signals after the quantization is decreased.

The quantization step function r(x) before removal of a noise of the input signal x determining an increment of the input signal x to an increment of the output signal y is a quantization step function before the removal of a noise when an analog amount is converted into a digital amount. The quantization step function r(x) before the removal of a noise will be described with reference to FIG. 1.

The quantization step function r(x) before the removal of a noise determines a quantization step before the removal of a noise corresponding to a true value x of a signal. The quantization step function r(x) before the removal of a noise and a signal probability distribution x+N(x) including a noise are shown for the true value x of an input signal. When the value of a signal sample including a noise is equal to or smaller than the middle value a+0.5 of the corresponding gray scale, the quantization on a is performed. When the value of the signal sample including a noise is larger than the middle value a+0.5 of the corresponding gray scale, the quantization on a+1 is performed. When the quantization is performed in the quantization step function r(x) before the removal of a noise, the quantization step function r(x) before the removal of a noise, that is, the width between a to a+1 is determined on the x axis so that the average value (expectation value of a signal before the quantization) of all samples before the quantization and the average value (expectation value of a signal after the quantization) of all samples after the quantization are decreased. The determination of the width on the x axis corresponds to calculation of the quantization step function r(x) (see Expression 6) before the removal of a noise corresponding to the true value x of the signal under a constraint condition indicated by Expression 7 described below.

$$r(x) = \max_{p \in R} r(x; p) \quad (6)$$

$$\left| E\left\{ \left\lfloor \frac{x+N(x)}{r(x)} + p \right\rfloor + 0.5 - p \right\} r(x) - x \right| < R(x) \quad (7)$$

In Expressions 6 and 7, R(x) is a function that determines a quantization step after the removal of a noise used when a signal of which a noise is removed is quantized. p is a disturbance value that is used to absorb the difference or the like between the origin point of the output signal of the image sensor and a reference voltage of an AD converter, and may be sufficiently searched in p∈[0, 1) for Expression 7.

A noise random variable N(x) is assumed to satisfy the property expressed by Expression 8 described below. In the above expression, E(•) is assumed to be a functional indicating an expectation value. In short, the average of a noise N(x) is assumed to be 0.

$$E\{N(x)\}=0 \quad (8)$$

Figure 2A:
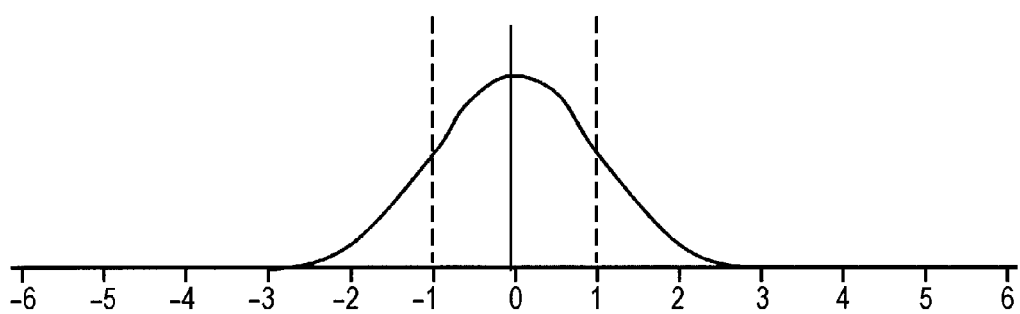
FIG. 2A is a diagram illustrating a distribution of sample values of a signal x+N(x) before the quantization.
Figure 2B:
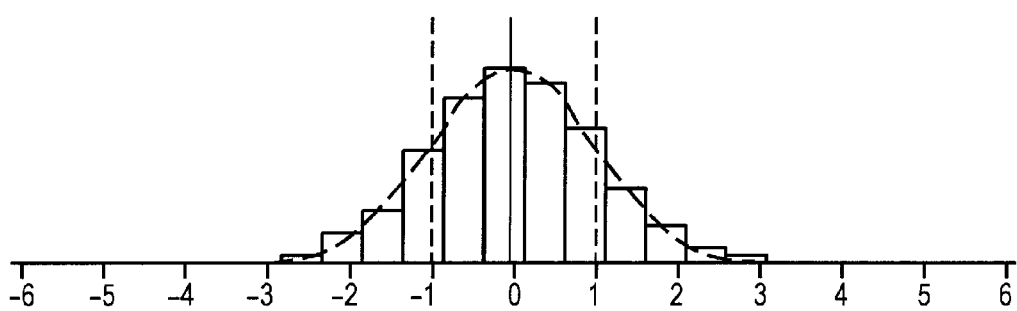
FIG. 2B is a diagram illustrating a distribution of sample values of a signal after the quantization when the quantization step function r(x) before the removal of a noise is set to have a given size.
Figure 2C:
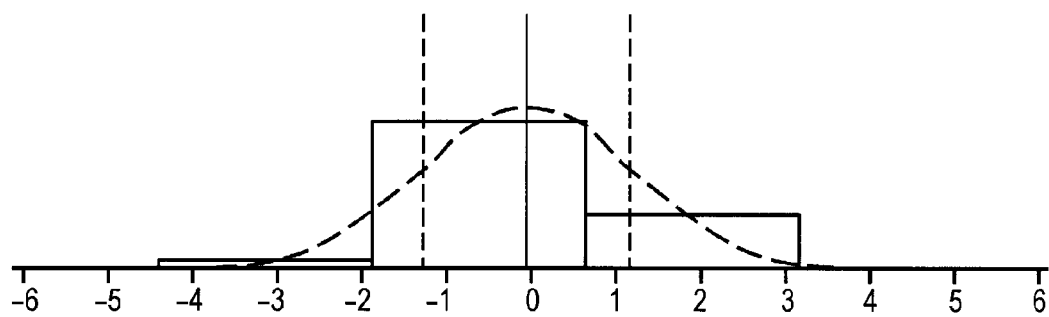
FIG. 2C is a diagram illustrating a distribution of sample values of a signal after the quantization when the quantization step function r(x) before the removal of a noise is set to be larger than that of FIG. 2B.
Figure 2D:
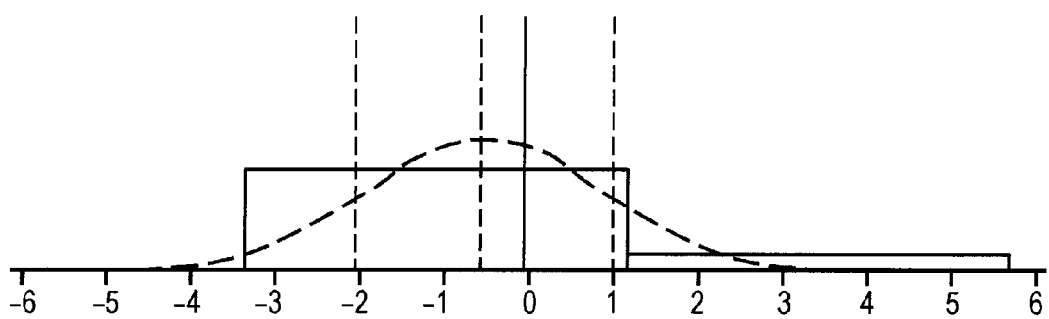
FIG. 2D is a diagram illustrating a distribution of sample values of a signal after the quantization when the quantization step function r(x) before the removal of a noise is set to be larger than that of FIG. 2C.
Figure 2E:
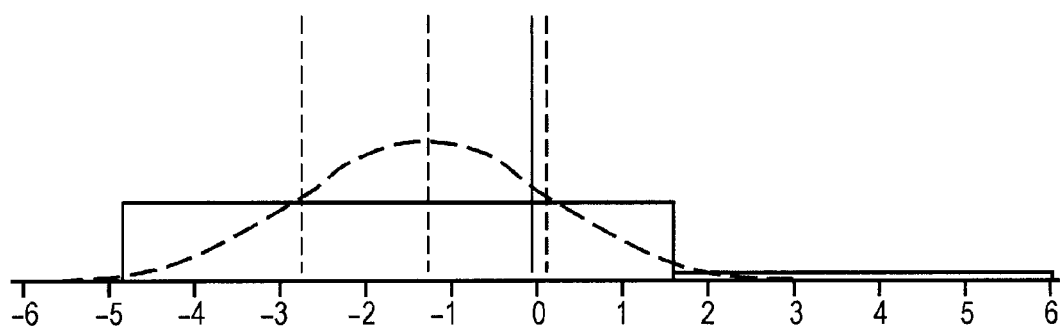
FIG. 2E is a diagram illustrating a distribution of sample values of a signal after the quantization when the quantization step function r(x) before the removal of a noise is set to be larger than that of FIG. 2D.

To explain calculation details of Expression 7, an expression in the inside of the absolute value sign of the left-hand side, that is, Expression 9 is considered. In FIGS. 2A to 2E, the calculation processes and the results of Expression 9 obtained by varying r(x) when x is a fixed value and p is a fixed value are shown. In FIG. 2A, the distribution of sample values of a signal x+N(x) before the quantization is shown. The shape of a normal distribution curve represents the distribution of the noise N(x) contained in the signal. A middle vertical solid line represents the average value of the samples. The right and left vertical dotted lines represent the size of a standard deviation. At this time, the average value is the same as the true value x. The quantization steps r(x) before the removal of a noise in FIGS. 2B to 2E are different from each other. The rectangular horizontal width represents the size of the quantization step function r(x) before the removal of a noise and the rectangular vertical width is proportional to the frequency of samples. The middle vertical solid line represents the average value of the samples. The right and left vertical dotted lines represent the size of a standard deviation. From the drawings, it can be understood that the average value is deviated from the true value with an increase in the value of the quantization step function r(x) before the removal of a noise. The deviation is a value calculated according to Expression 9. That is, R(x) in Expression 7 can be considered to be a function representing the limit of the size of the deviation.

$$E\left\{\left\lfloor\frac{x+N(x)}{r(x)}+p\right\rfloor+0.5-p\right\}r(x)-x \quad (9)$$

(average value after quantization)−(true value)

Figure 2F:
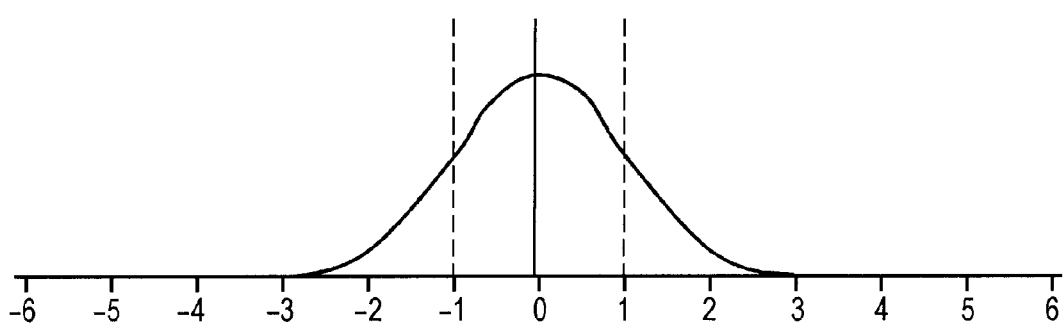
FIG. 2F is a diagram illustrating a distribution of sample values of a signal x+N(x) before the quantization.
Figure 2G:
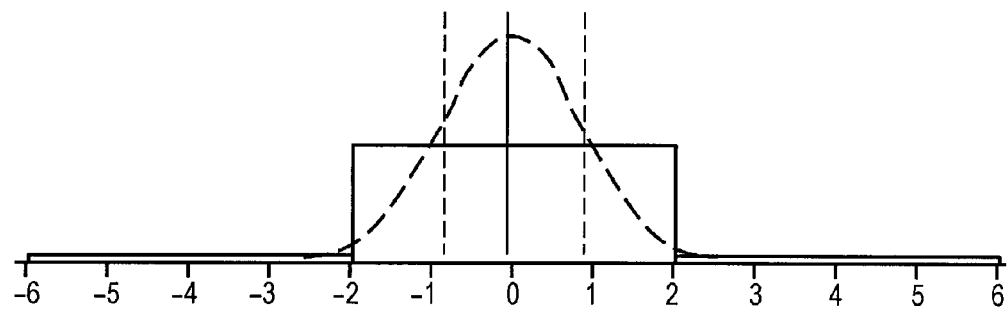
FIG. 2G is diagram illustrating a distribution of sample values of a signal after the quantization when a disturbance value p is set to have a given size.
Figure 2H:
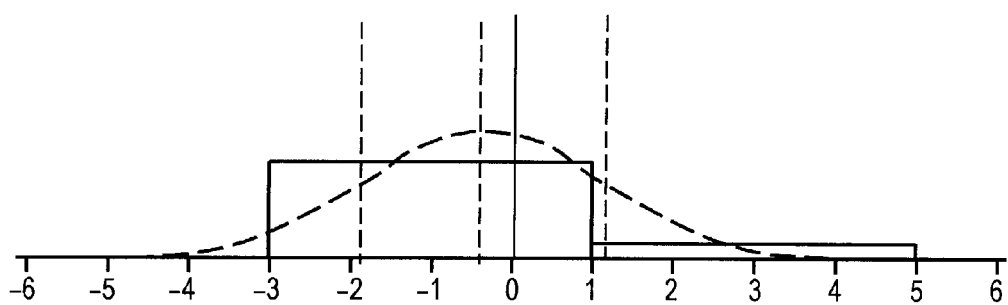
FIG. 2H is a diagram illustrating a distribution of sample values of a signal after the quantization when the disturbance value p is set to have a given size.
Figure 2I:
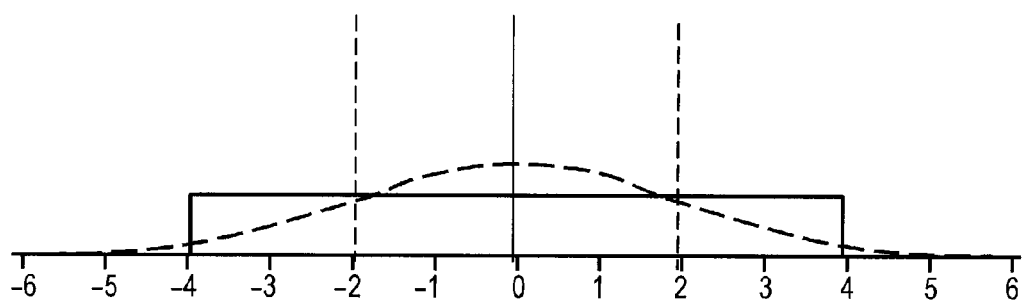
FIG. 2I is a diagram illustrating a distribution of sample values of a signal after the quantization when the disturbance value p is set to have a given size.
Figure 2J:
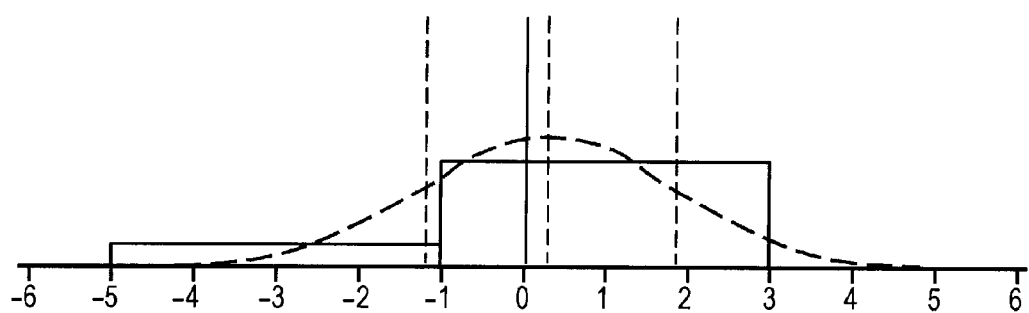
FIG. 2J is a diagram illustrating a distribution of sample values of a signal after the quantization when the disturbance value p is set to have a given size.

In FIGS. 2F to 2J, the calculation processes and the results of Expression 9 obtained by varying the disturbance value p when x is a fixed value and r(x) is a fixed value are shown. In FIG. 2F, the distribution of sample values of the signal before quantization is shown and is the same as that shown in FIG. 2A. The disturbances p in FIGS. 2G to 2J are different from each other. From the drawings, it can be understood that the average value is deviated from the true value due to the variation in the disturbance p. Since the disturbance p occurs due to the declination between the origin point of the output signal of the image sensor and the reference voltage of the AD converter, the value of the quantization step function r(x) before the removal of a noise is calculated in consideration of the worst case caused by the disturbance value p in Expression 6.

The quantization step function R(x) after the removal of a noise of the input signal x determining an increment of the input signal x to an increment of the gray scale of the image data from which the noise is removed by a development process can be estimated from a gray scale conversion characteristic obtained as the result of various image processes of the next stage. Hereinafter, the gray scale conversion characteristic is referred to as tone curve. The gray scale correction by de-mosaic, white balance, and tone curve of the next stage and a series of other image signal processing are considered to be a single process, and the input and output relation of the single process is assumed to be an equivalent to the tone curve Y(x). At this time, in the gray scale conversion, lightness for displaying a desired image can be obtained when value are converted using several tone curves Y(x) shown in FIG. 3. That is, the lightness of an image corresponding to the signal value on the horizontal axis of FIG. 3 may be converted into a value of the lightness of the vertical axis using several tone curves Y(x).

Figure 3:
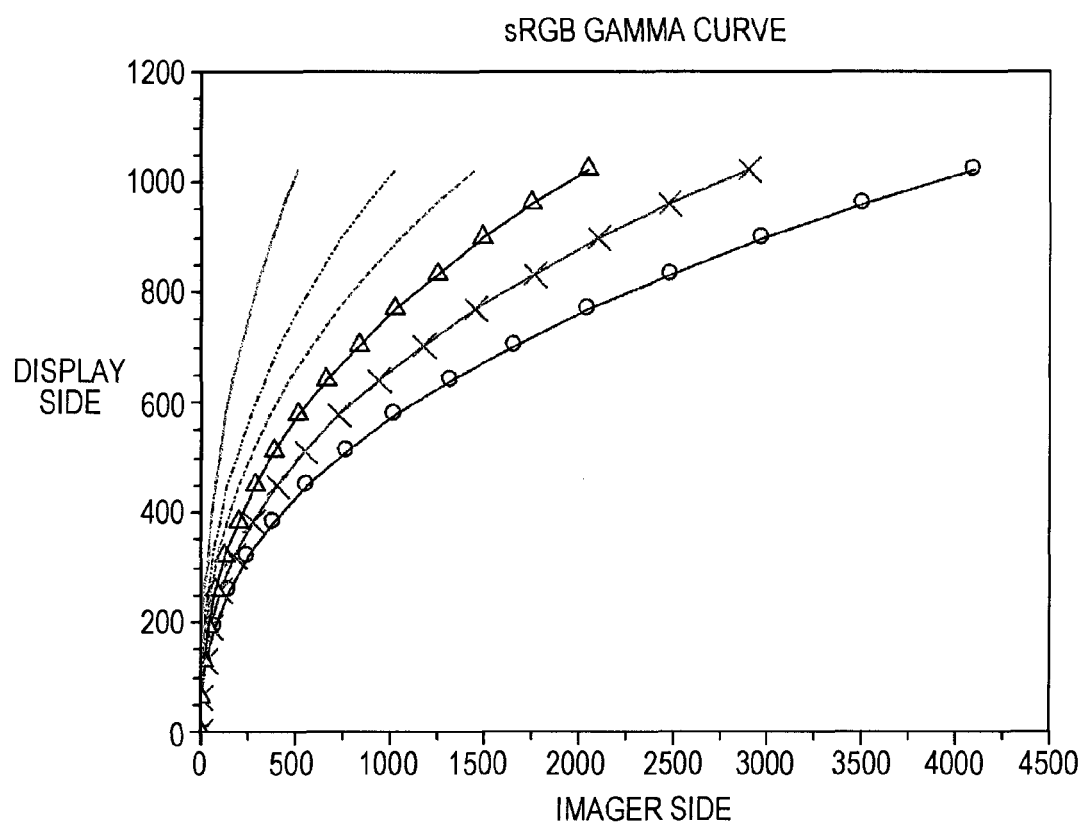
FIG. 3 is a diagram illustrating a tone curve representing the relation of a gray scale Y(x) after the conversion with the input signal x.
Figure 4:
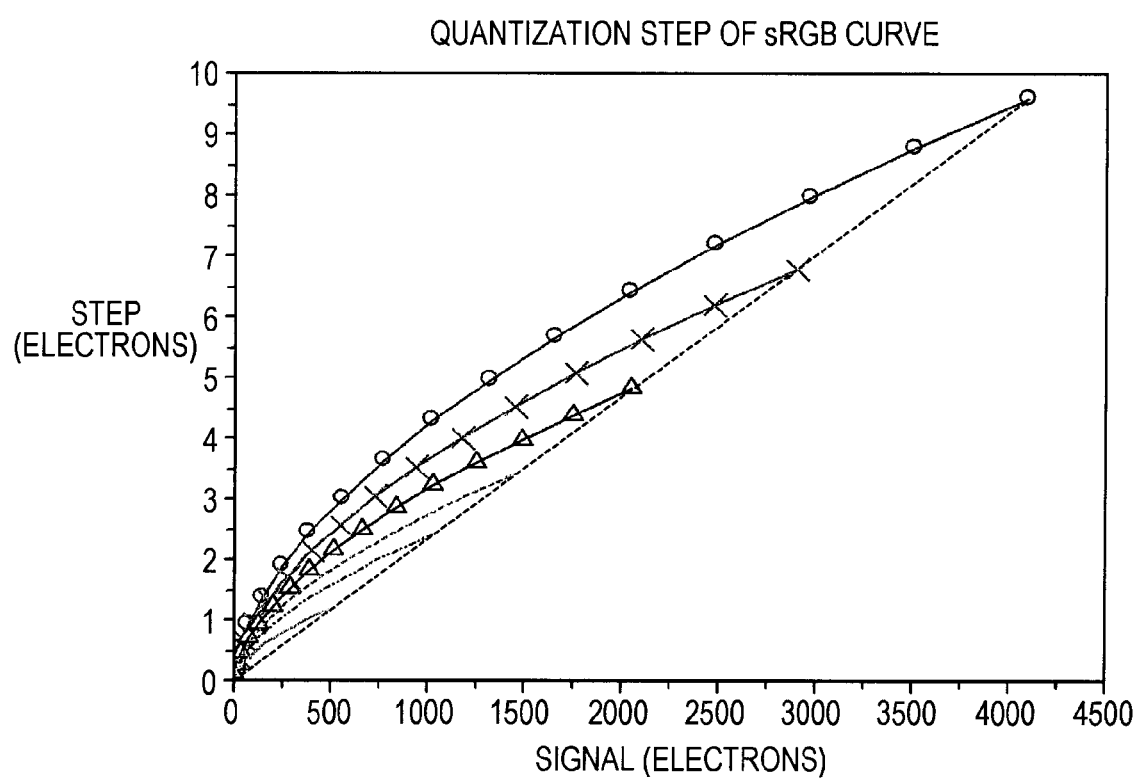
FIG. 4 is a diagram illustrating a relation of the input signal x and the quantization step function R(x) after the noise of the input signal x determining an increment of the input signal x to an increment of the gray scale of image data from which a noise is removed in a development process.

The quantization step function R(x) after the removal of a noise of the input signal x determining an increment of the input signal x to an increment of the gray scale of the image data from which the noise is removed by the development process corresponds to an increment of the input signal on the horizontal axis to an increment of the lightness of an image on the vertical axis in each tone curve Y(x) shown in FIG. 3. That is, the quantization step function R(x) after the removal of a noise is Expression 10 described below. In FIG. 4, the quantization step function R(x) after the removal of a noise is drawn in correspondence to the tone curve Y(x) shown in FIG. 3.

As for the quantization step function R(x) actually used in the calculation of Expression 7, one curve may be selected from the curves obtained in FIG. 4 and is used as R(x). The minimum value is calculated for each of the signal values x of a plurality of non-linear curves and may be used as R(x). R(x) using the minimum value becomes a straight line indicated by dotted lines in FIG. 4. A user can simply adjust the quantization step function R(x) after the removal of a noise by adjusting the slope of the straight line.

$$R(x)=\frac{1}{\frac{dY(x)}{dx}} \quad (10)$$

When R(x) is calculated, r(x) shown in Expression 6 may be sufficiently searched in p∈[0, 1) under the constraint condition shown in Expression 7.

Figure 5:
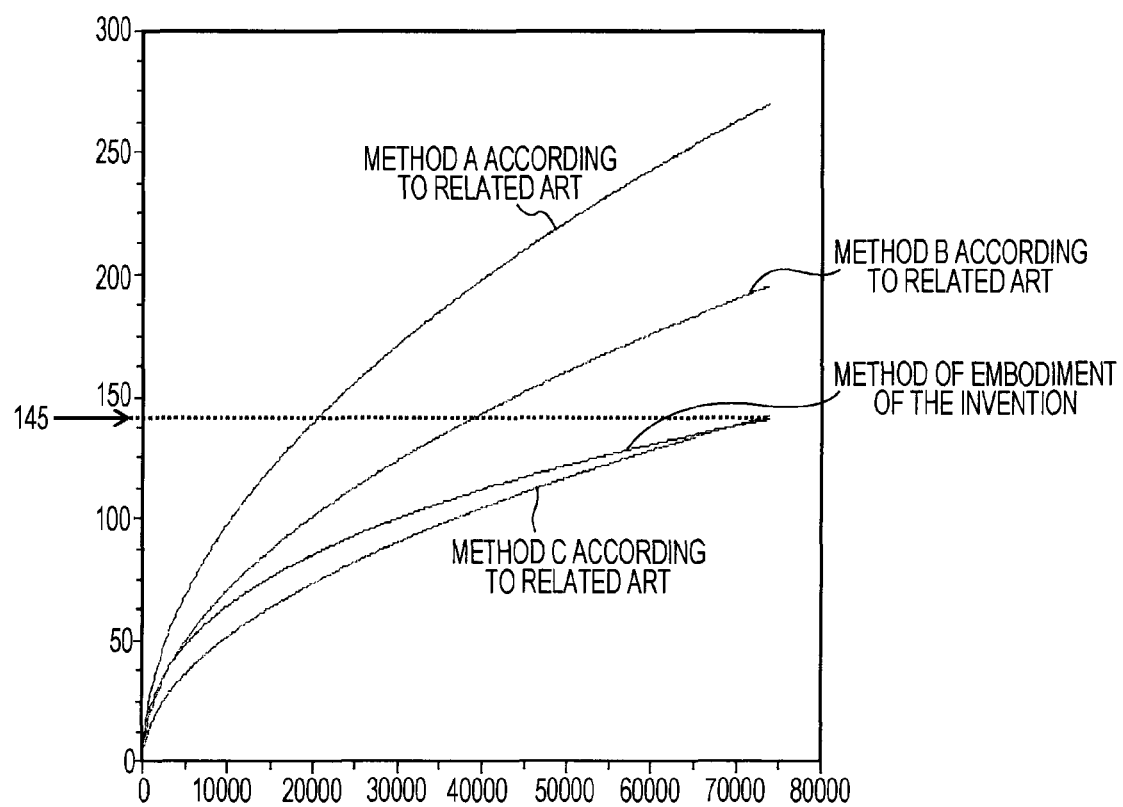
FIG. 5 is a diagram illustrating comparison between Expression 1 according to the related art and Expression 3 according to an embodiment of the invention.
Figure 6A:
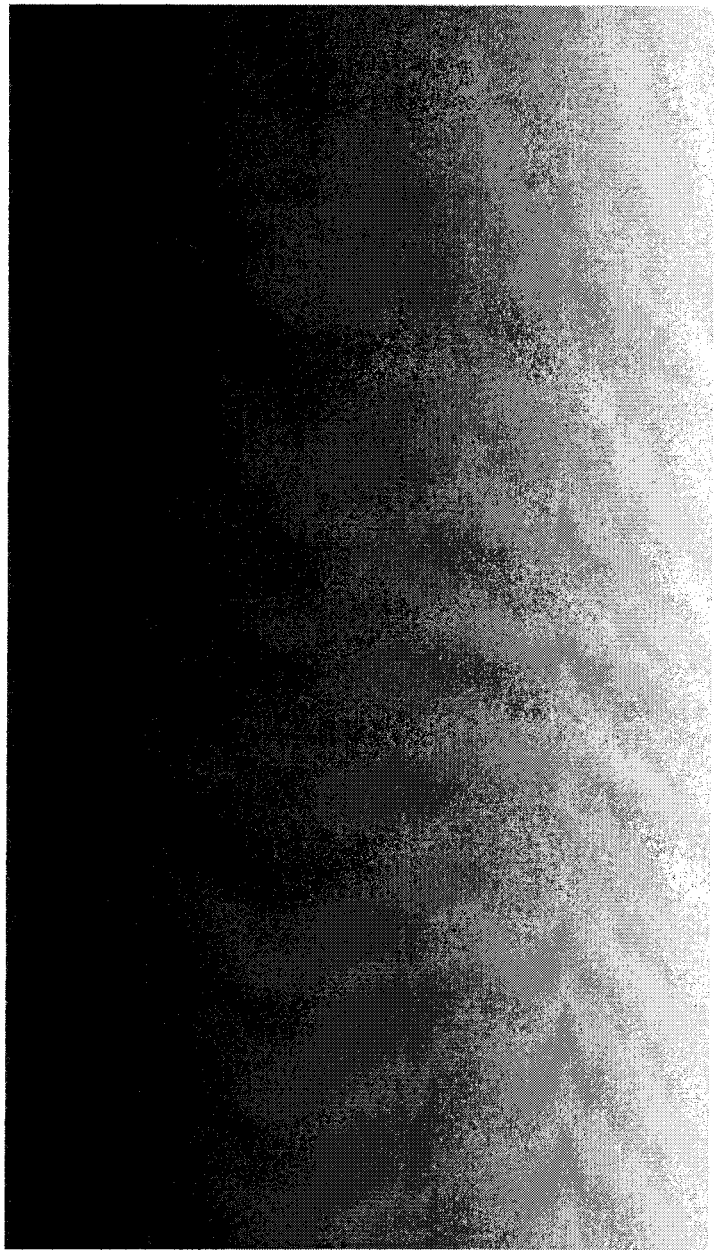
FIG. 6A is a diagram illustrating an example of the result obtained compressing and restoring a RAW image using the calculation result of Expression 3 by a method according to the embodiment of the invention in FIG. 5.
Figure 6B:
FIG. 6B is a diagram illustrating an example of the result obtained compressing and restoring a RAW image using the calculation result of Expression 3 by a method according to the related art in FIG. 5.

In FIG. 5, the quantization step function r(x) before the removal of a noise is calculated under the constraint condition shown in Expression 9, and the function of Expression 3 is graphed using the result of the calculation. In FIG. 5, methods A to C according to the related art are shown using Expression 1 for comparison. As illustrated in FIG. 5, the result of the calculation obtained by a method according to the embodiment of the invention is different from that obtained by the methods according to the related art, and there is the result which may not be normally obtained in Expression 1. The result processed by the method according to the embodiment of the invention in FIG. 5 using a gradation image varied from darkness to lightness is shown in FIG. 6A. In addition, the result processed in correspondence to the example C according to the related art in FIG. 5 is shown in FIG. 6B for comparison. Either is quantized in the maximum 145 gray scales, but the image quality is different. No unnatural gray scales are shown in the method according to the embodiment of the invention in FIG. 6A, whereas unnatural gray scales are noticeably shown in the method according to the related art in FIG. 6B.

Figure 18:
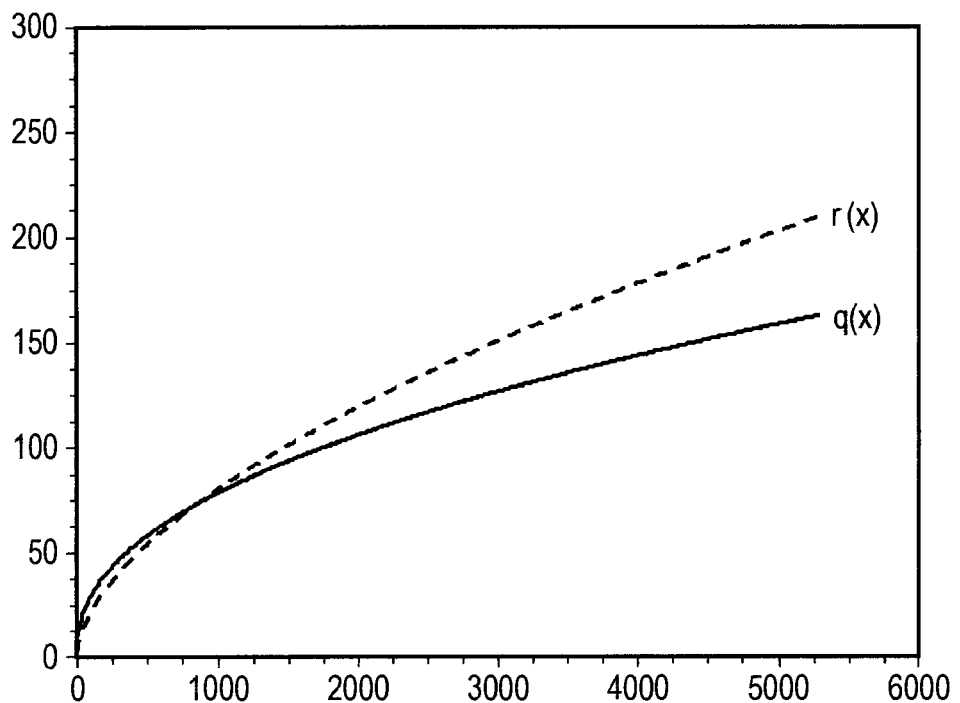
FIG. 18 is a diagram illustrating comparison between a value of r'(x) substituting for the quantization step function r(x) before the removal of a noise and a value of a quantization step function q(x) before the removal of a noise calculated by another method.

The method according to the embodiment of the invention may be combined and used with a quantization step function q(x) before the removal of a noise calculated by another method. For example, as in FIG. 18, the quantization step function r(x) before the removal of a noise calculated in the method according to the embodiment of the invention is substituted by r'(x). The value of r'(x) is compared to the value of quantization step function q(x) before the removal of a noise calculated by another method and the smaller value is selected. r(x) corresponding to Expression 6 is calculated by Expression 11.

$$r(x)=\min(r'(x),q(x)) \quad (11)$$

Figure 19:
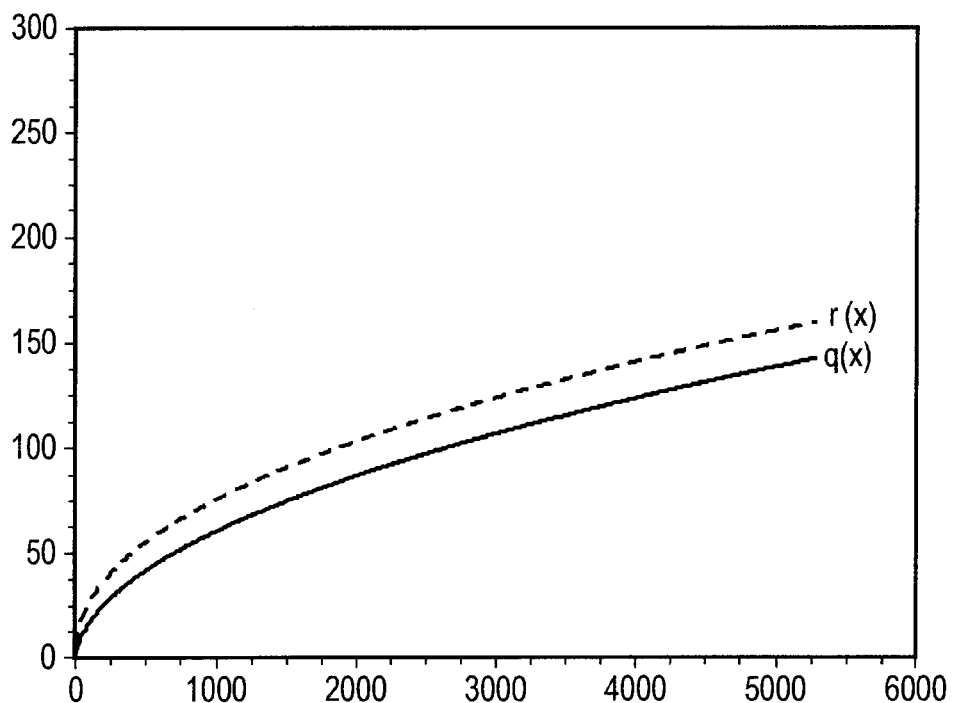
FIG. 19 is a diagram illustrating comparison between a value of r'(x) substituting for the quantization step function r(x) before the removal of a noise and a value of a quantization step function q(x) before the removal of a noise calculated by another method.

When Expression 11 simply satisfies the condition shown in Expression 12 for all x of the normally possible range, as shown in FIG. 19, Expression 11 may be expressed simply as Expression 13.

$$r'(x) \geq q(x) \quad (12)$$

$$r(x)=q(x) \quad (13)$$

By using the function n(x) and the constant c in Expression 14 for the quantization step function q(x) before the removal of a noise with reference to the method (related art) of Expression 1 described above, the characteristics of the method according to the related art and the method according to the embodiment of the invention can be combined appropriately.

$$q(x)=n(x)/c \quad (14)$$

In the calculation results obtained by the method according the related art and the method according to the embodiment of the invention, for example, the original properties described with reference to FIG. 5 are different. Since it is possible to suppress the occurrence of the noise such as solarization by the method according to the embodiment of the invention while the amount of noise with a sense of roughness is controlled using Expression 14 by varying the constant C in Expression 1 according to the related art, the degree of freedom to control the image quality is improved.

To apply the method according to the embodiment of the invention to an image device, the function r(x) may be converted into an approximation function for use. In an AD converter used in an example according to the related art, the relation between a signal value and an output value is linear and the quantization step becomes a fixed value. On the other hand, in the method according to the embodiment of the invention, a technical gap in the mounting is large since the quantization step is varied by the value of x. Here, r(x) is approximated as below according to the configuration in which a plurality of linear AD converters is combined.

Figure 20:
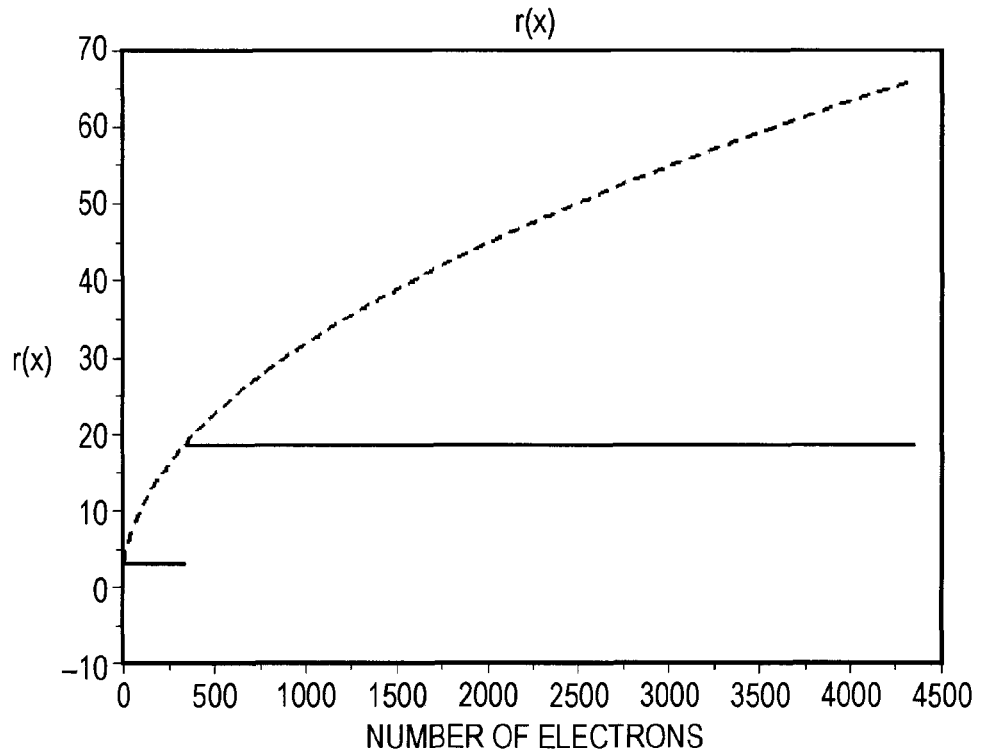
FIG. 20 is a diagram illustrating approximation of r(x) to a line segment defined in $[x_0, x_r]$ and to two constants defined in $[x_r, x_1]$.

For example, as shown in FIG. 20, r(x) can be approximated to a line segment defined in $[x_0, x_t]$ and to two constants defined in $[x_t, x_1]$, when the domain of definition of r(x) is $[x_0, x_1]$. Expression 15 is the approximation expression.

$$r(x) = \begin{cases} r_0 & \text{(when } x_0 \leq x \leq x_t\text{)} \\ r_1 & \text{(when } x_t \leq x \leq x_1\text{)} \end{cases} \quad (15)$$

In this expression, constants $r_0$ and $r_1$ can be obtained by searching the minimum value of the section, as in Expressions 16 and 17 below, respectively.

$$r_0 = \min_{x_0 \leq x \leq x_t} r(x) \quad (16)$$

$$r_1 = \min_{x_t \leq x \leq x_1} r(x) \quad (17)$$

In this expression, constants $r_0$ and $r_1$ become quantization steps when the signal value x is quantized. The numbers of quantum levels are $L_0$ and $L_1$ in Expressions 18 and 19, respectively.

$$L_0=(x_1-x_0)/r_0 \quad (18)$$

$$L_1=(x_1-x_t)/r_1 \quad (19)$$

Figure 21:
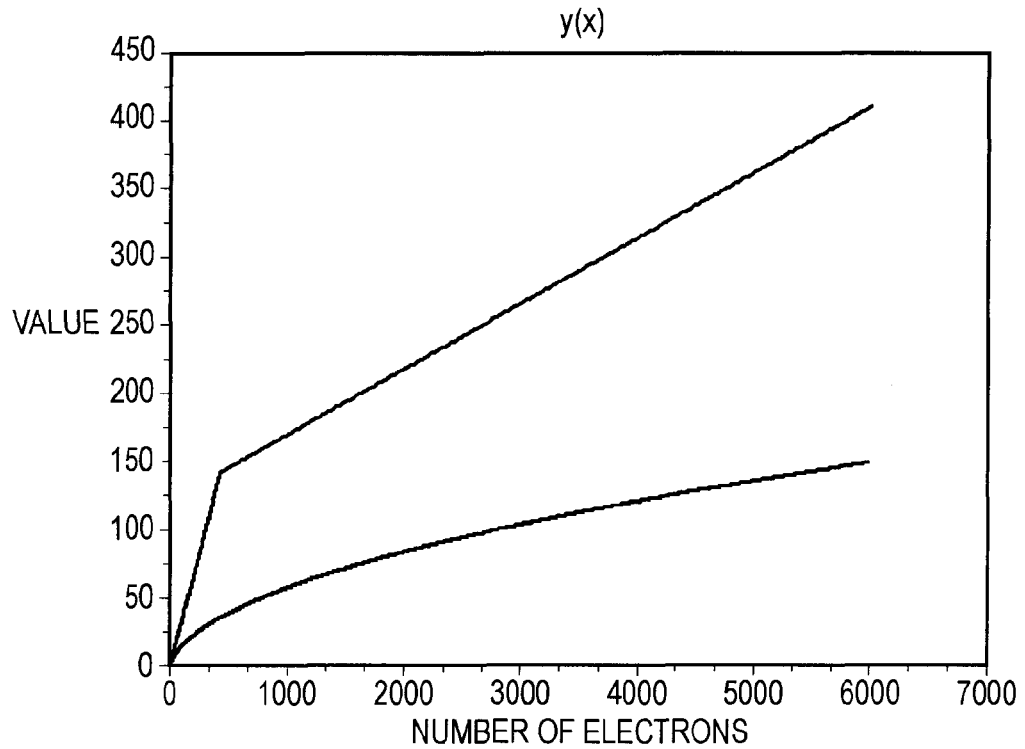
FIG. 21 is a graph of a conversion function realized in Expression 1 when r(x) shown in FIG. 20 is used.

The relation between the actual signal value and the value obtained after the conversion can be obtained as a function calculated by Expression 1. For example, when r(x) shown in FIG. 20 is used, the conversion function realized in Expression 1 can be graphed as in FIG. 21.

Figure 22:
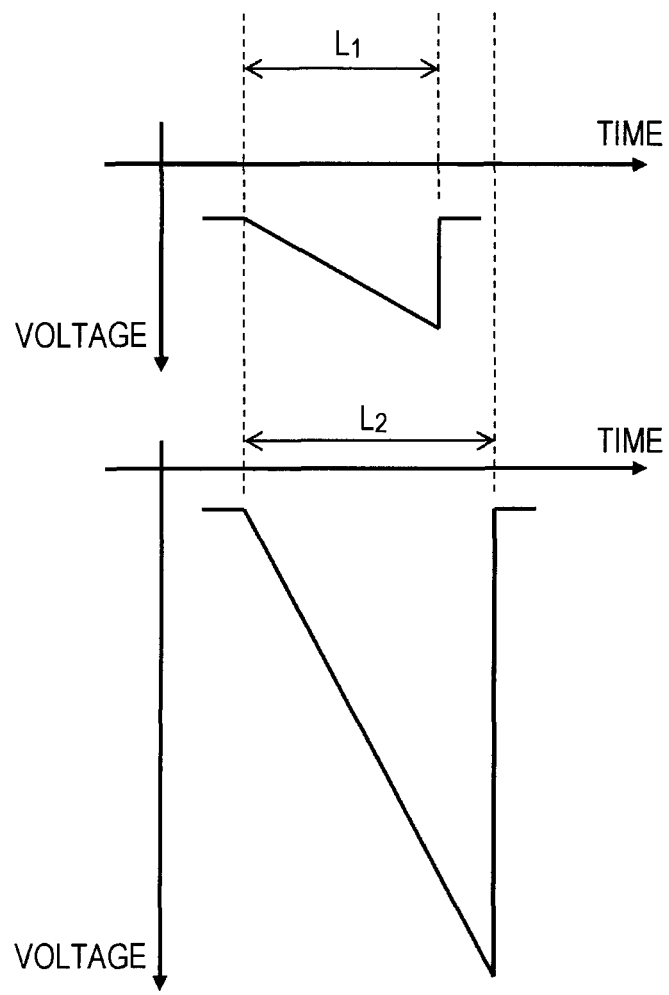
FIG. 22 is a diagram illustrating times until the conversion operation of each of the AD converters simultaneously performing the conversion operation ends.

The value of $x_t$ is optimized in response to the mounting. For example, when the plurality of linear AD converters are mounted to operate in parallel simultaneously, as shown in FIG. 22, a time taken from simultaneous start of a conversion operation of all the AD converters to end of the conversion operation of all the AD converters is one reference of the optimization. That is, $x_t$ is calculated in an optimization expression such as Expression 20.

$$x_t=\arg_{x_t}\min(\max(L_1,L_2)) \quad (20)$$

Figure 23:
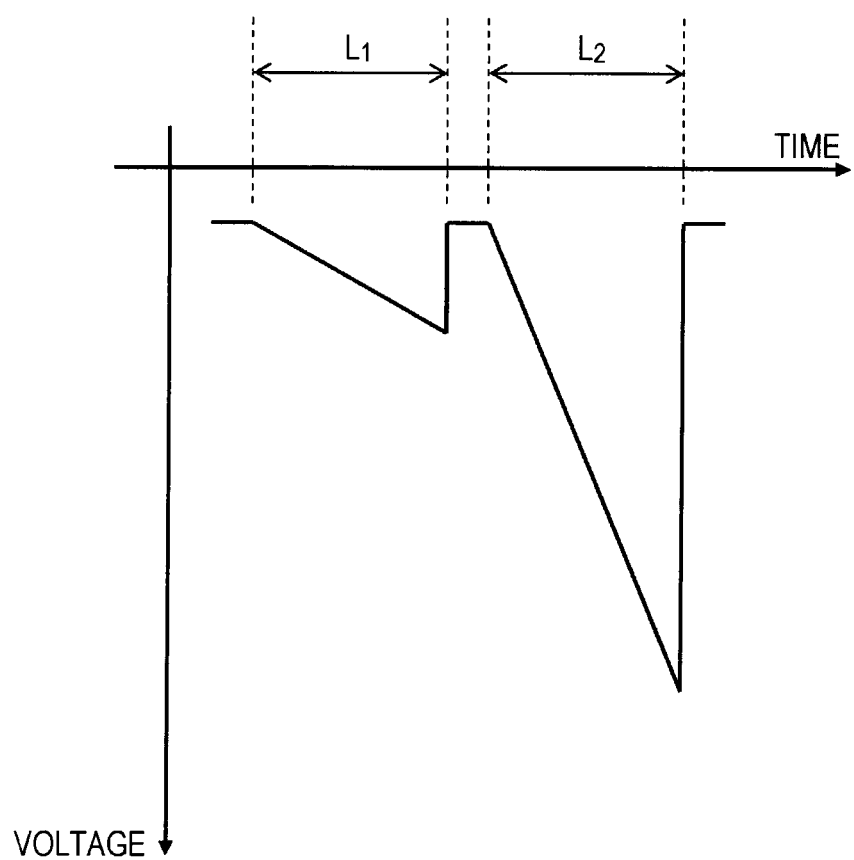
FIG. 23 is a diagram illustrating a time until each conversion operation ends when one linear AD converter actually operates in a time division manner to perform the AD conversion twice.

For example, when one linear AD converter operates in a time division manner and AD conversion is actually performed twice, as shown in FIG. 23, a time taken to end the conversion operation twice continuously is one reference of the optimization. That is, $x_t$ is calculated in an optimization expression such as Expression 21.

$$x_t=\arg_{x_t}\min(L_1+L_2) \quad (21)$$

When the physical constraint of a device has an influence on the calculation of the optimization at the operation time, it is desirable to optimize the calculation in consideration of the influence. For example, when the AD conversion is continuously performed, a time waiting until a signal of an electric circuit is stabilized is necessary. It is desirable to perform the optimization in consideration of the overhead time.

Figure 24:
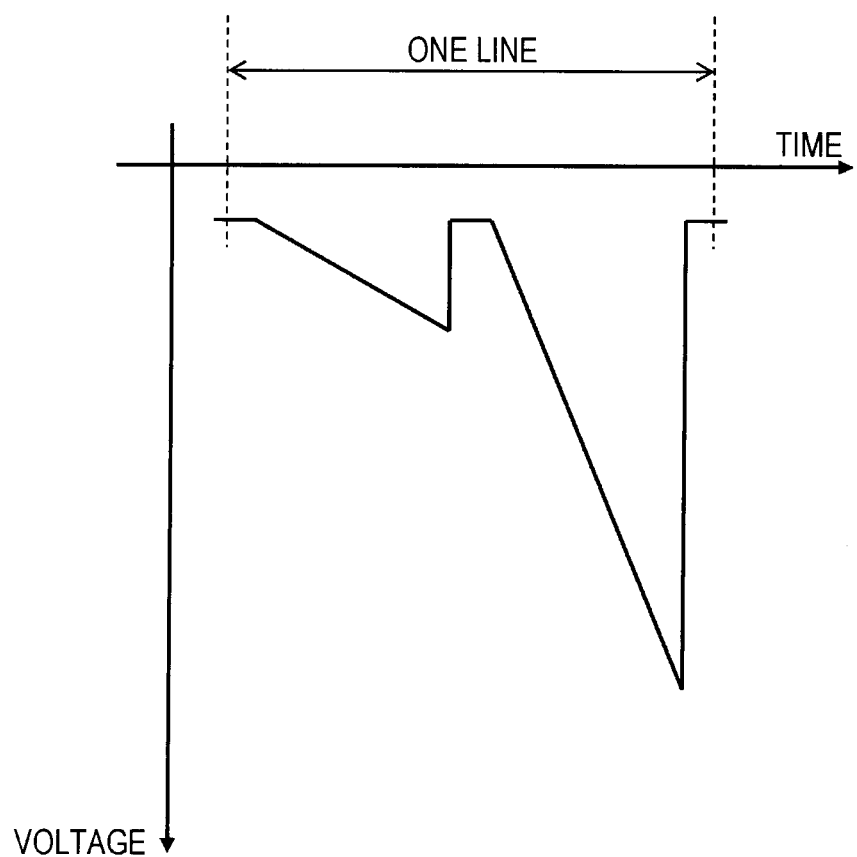
FIG. 24 is a diagram illustrating a reference voltage supplied to a comparator of the AD converter converting all of the pixels corresponding to one line.

The quantization step function r(x) calculated by Expression 15 is realized as in Expression 24 using an actual AD converter. The AD converter may be attached to the outside or may be built in the inside depending on the kinds of image device. In particular, the built-in AD converter performs the AD conversion on all of the signal values of pixels corresponding to one line by line of a pixel array in parallel. In FIG. 24, a reference voltage applied to a comparator of the AD converter converting all of the pixels corresponding to one line is shown. The values of the signal are converted into digital values by allowing the comparator to detect the time when the reference voltage is varied with time and the magnitude relation between the signal values and the reference voltage is reversed. The constants $r_0$ and $r_1$ in Expression 15 correspond to the quantization step when the AD conversion is performed, that is, the slope of the reference voltage. In FIG. 24, the reference voltage is shown when the AD conversion is performed twice in a time division manner at the reference voltage with two slopes. In a portion in which the signal level is small, the signal can be measured with the reference voltage with the smaller slope. Therefore, since the quantization step is performed minutely, the measurement can be performed minutely even in a small signal. In a portion in which the signal level is large, the signal can be measured with the reference voltage with the larger slope. Therefore, the signal can be measured in a large dynamic range.

Figure 25:
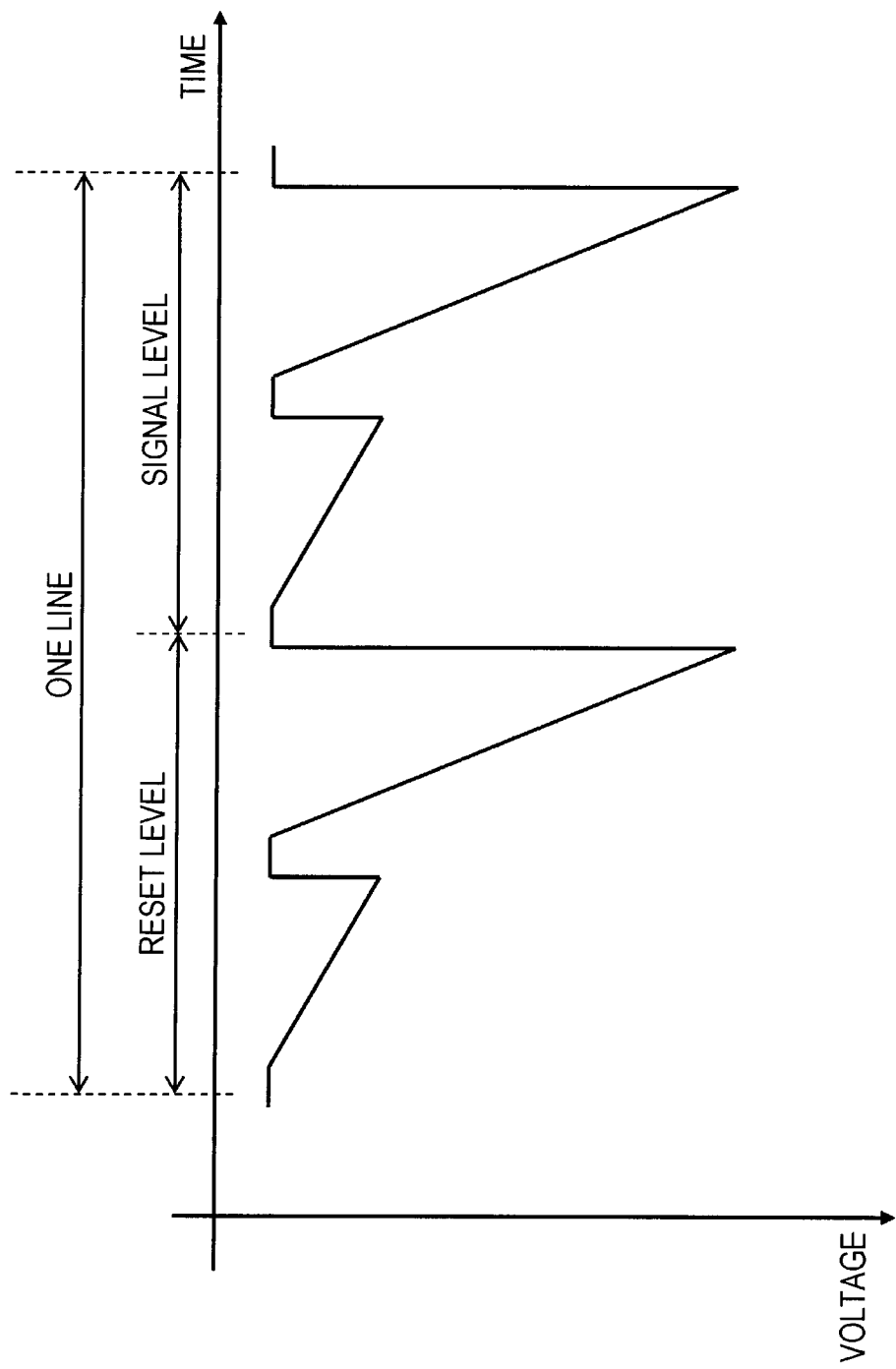
FIG. 25 is a diagram illustrating an example of a reference voltage when a digital circuit performs CDS.

In order to obtain the signal value of a normal pixel in the image device, a difference between a signal level and a reset level is calculated to obtain the value of a signal with no noise of the reset level. This process is called CDS (Correlated Double Sampling). There is the CDS performed in an analog circuit and a digital circuit. In FIG. 24, the reference voltage is illustrated on the assumption that the AD converter inputs a signal subjected to the CDS by the analog circuit. On the other hand, in FIG. 25, the exemplary reference voltage is illustrated when the digital circuit performs the CDS. The AD conversion is performed in two kinds of quantization steps to measure the reset level, and then the AD conversion is performed in two kinds of quantization steps to measure the signal level.

The conversion of the quantization step of the AD converter may not be performed for each pixel, but the AD conversion of the AD converter may be performed plural times for each pixel unit in a pseudo manner by performing the AD conversion using a period unit, such as a horizontal scanning unit or a frame unit, longer than each pixel.

Figure 26:
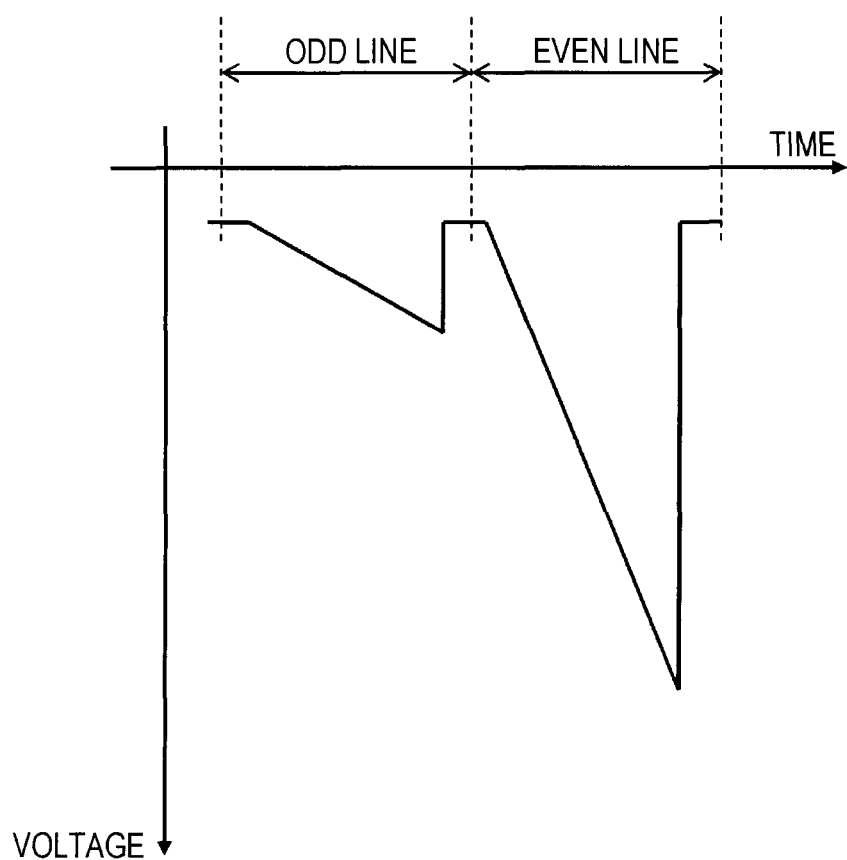
FIG. 26 is a diagram illustrating an example (example of an analog CDS) of the AD conversion on an even line and an odd line in different quantization steps.
Figure 27:
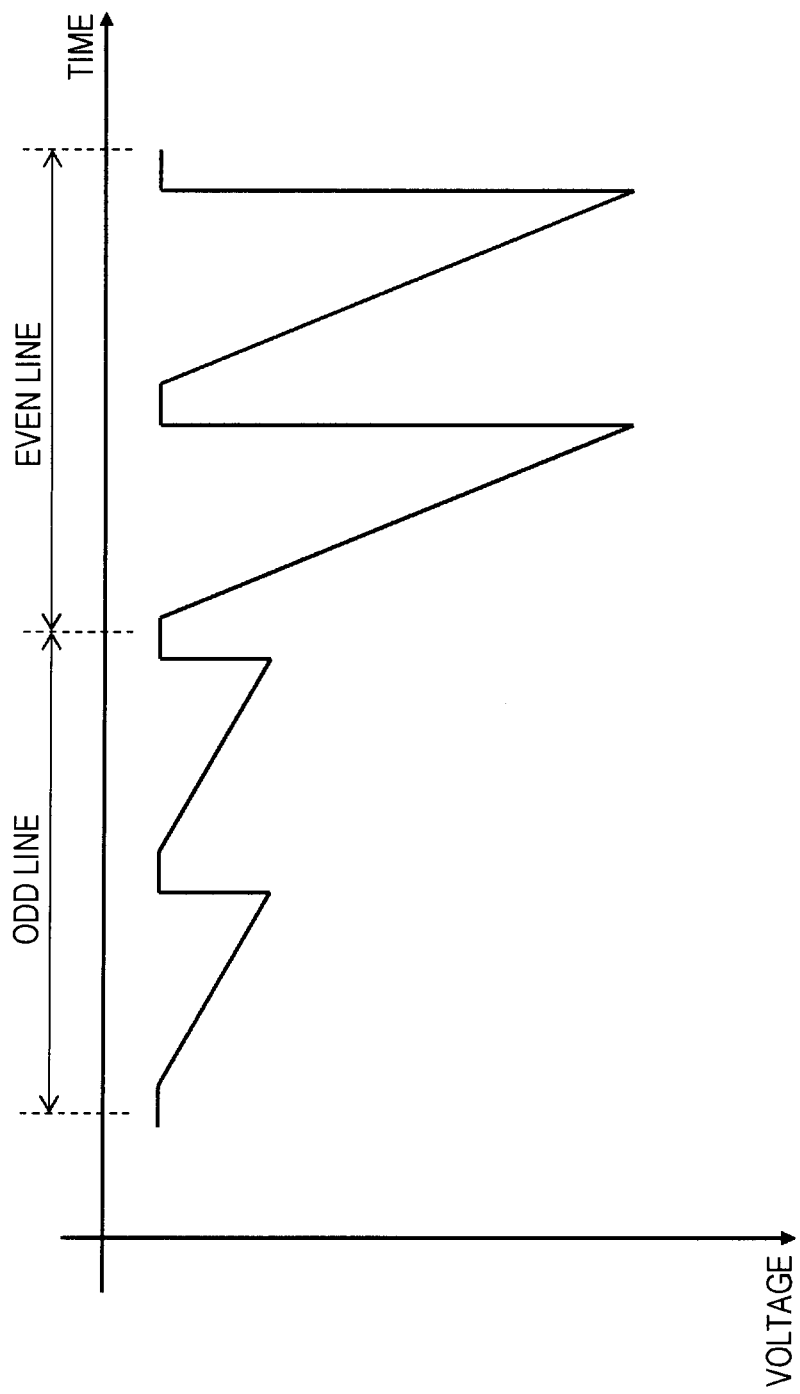
FIG. 27 is a diagram illustrating an example (example of a digital CDS) of the AD conversion on an even line and an odd line in different quantization steps.

For example, in an image device according to the related art, there are a pixel adding mode and a pixel thinning mode when a moving-image particularly is output. In these modes, the pixels of a plurality of adjacent horizontal lines are regarded as one line and the data is output. However, by combining these modes and the method according to the embodiment of the invention, it is possible to realize a new mode in which the AD conversion is performed on an even line and an odd line in different quantization steps, as in FIG. 26, and the line with better image quality is selected and output. In FIG. 26, an example of an analog CDS is shown. In FIG. 27, an example of a digital CDS is shown.

Alternatively, the modes may be used by dynamically selecting the different quantization steps for each line or each area with at least one pixel of the pixel array. The quantization steps are selected with reference to the values of adjacent pixels in a temporal or special direction of the corresponding pixel or line.

When the plurality of AD converters are combined and the same output as the output of a single AD converter is realized in a pseudo manner, a problem may arise in a method of a correction process of correcting a difference in the conversion characteristics caused by variation between the quantization steps or quantization offsets of the AD converters. Even in a digital CDS, the reset level may be measured only once. Even in this case, the same process is necessary.

Figure 28:
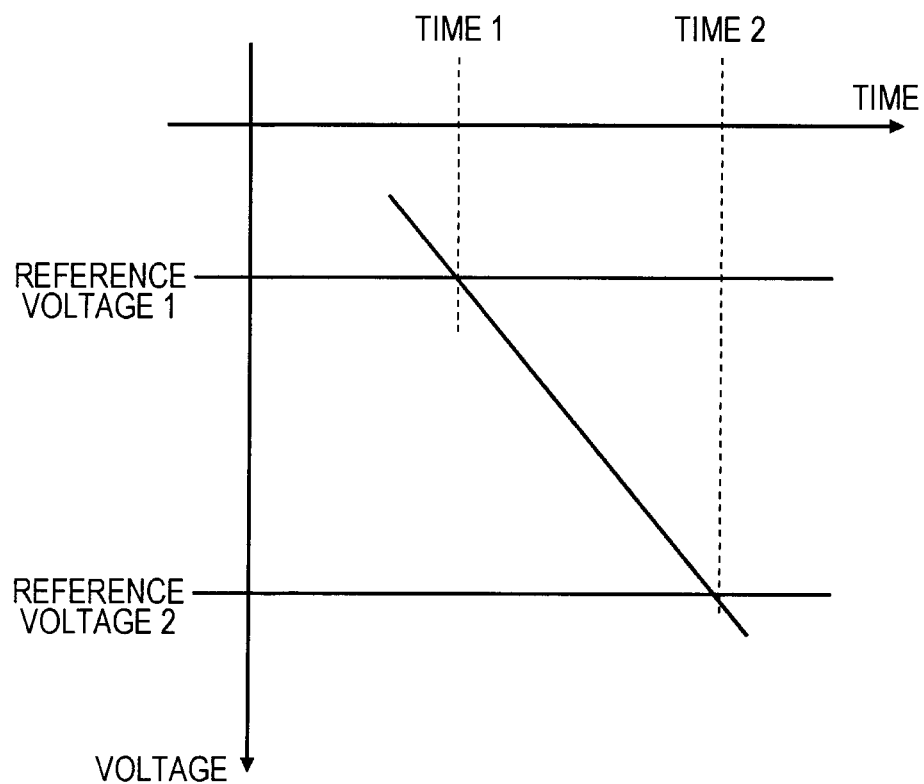
FIG. 28 is a diagram illustrating an example in which two adjustment reference voltages are prepared and respective passage times are measured by one AD converter.

When the variation of the quantization steps may not be ignored, it is necessary to correct the variation between the quantization steps. In order to correct the variation between the quantization steps, as shown in FIG. 28, two adjustment reference voltages may be prepared and one AD converter may measure respective passage times. As illustrated, by calculating a voltage difference for the times, the actual quantization step of the AD converter can be estimated.

Figure 29:
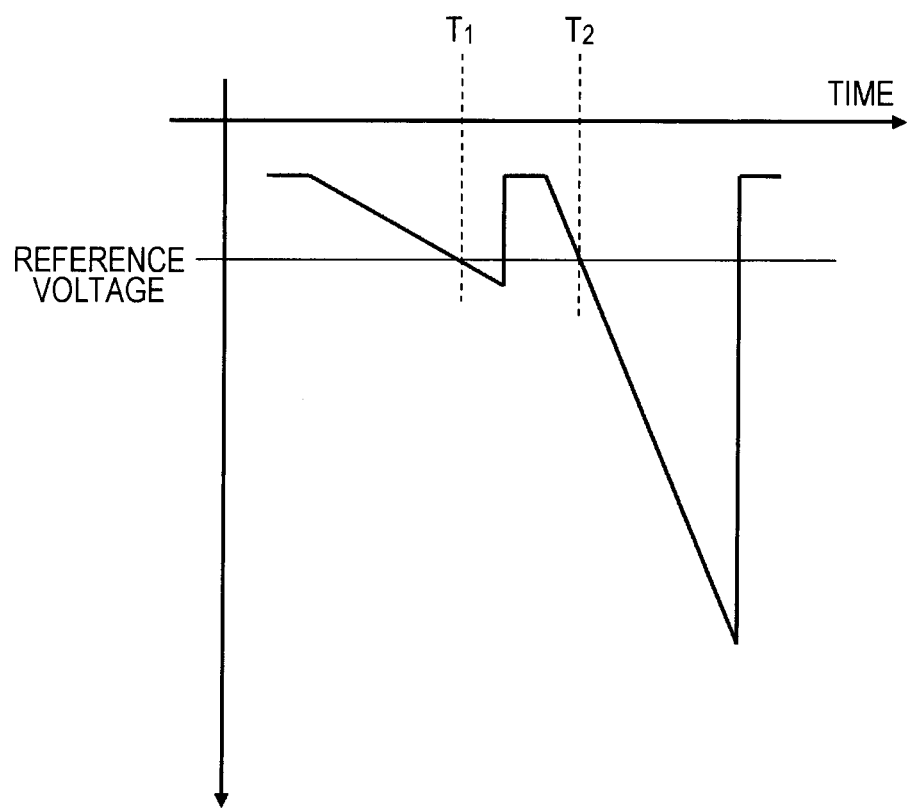
FIG. 29 is a diagram illustrating an example in which one adjustment reference voltage is prepared, and a given reference time $T_0$ and passage times $T_1$ and $T_2$ are measured respectively by the AD converters of two different quantization steps.

On the other hand, to correct the quantization offsets, as in FIG. 29, at least one adjustment reference voltage is prepared, and a given reference time $T_0$ and passage times $T_1$ and $T_2$ are measured respectively by the AD converters of the two different quantization steps on the assumption that a reducible reference voltage can be controlled. Then, when simultaneous equations (Expression 22) shown below are solved, the respective quantization offsets are calculated.

$$\begin{cases} v_0 = a_0(T_1 - T_0) + b_0 \\ v_0 = a_1(T_2 - T_0) + b_1 \end{cases} \quad (22)$$

In the simultaneous equations, $a_0$ and $a_1$ are the quantization steps of the respective AD converters, $v_0$ is the adjustment reference voltage, and $b_0$ and $b_1$ are the quantization offsets. By solving the simultaneous equations, a value is obtained by subtracting $b_0$ from $b_1$. Therefore, the conversion value of one AD converter can be replaced by the conversion value of the other AD converter.

When a noise is contained in the adjustment reference voltage, the influence of the noise may not be ignored in one-time measurement. Therefore, the average of the plurality of measurement results may be calculated. By increasing the adjustment reference voltage, using a least-squares method, and calculating the average of the measurement results, the influence of the noise may be reduced.

Figure 30:
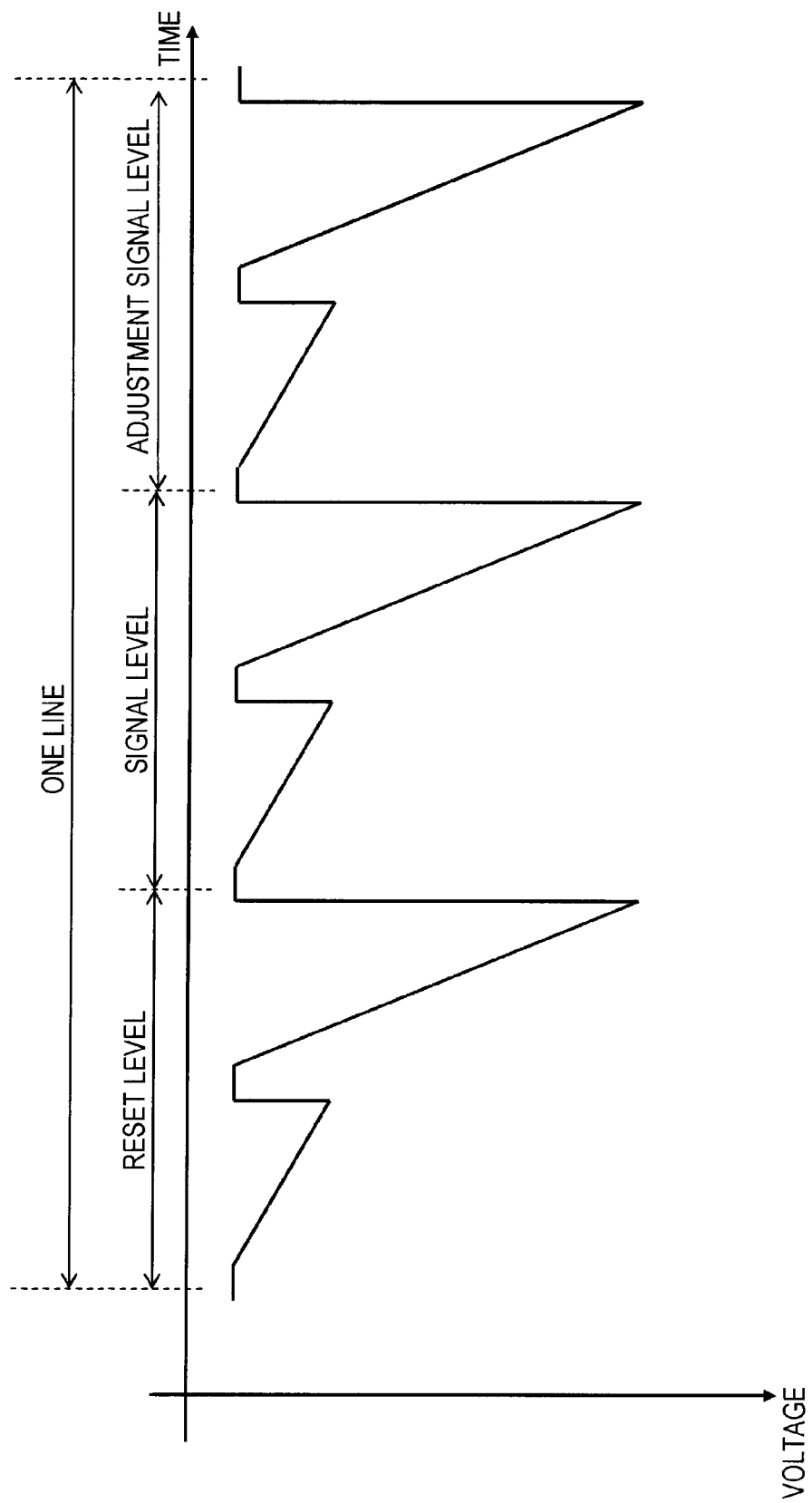
FIG. 30 is a diagram illustrating an example in which a correction process is performed for each 1 AD period.

The correction process is performed for each 1 AD conversion period, as in FIG. 30. During the 1 AD conversion period, the reset level and the signal level are measured for the digital CDS and the adjustment signal level continues to be measured for the correction process. The adjustment signal level is measured using the adjustment reference signal. The frequency of the measurement of the adjustment signal level may be reduced depending on the physical characteristics of the image device. For example, the adjustment signal level may be measured once when the AD conversion is performed several times, or the adjustment signal level may be measured several times for one frame. When the correction process is not necessary for temperature or elapsed time, the measurement of the adjustment signal level or the correction process may be performed only once after the shipment. When complete adjustment is necessary, the measurement of the adjustment signal level or the correction process may be not performed.

A problem when the adjustment reference signal is measured will be described. In a case where the quantization steps of two AD converters are considerably different from each other, rough quantization is performed when the AD conversion in the considerably different quantization steps is performed. When the black level of the image device is measured in the rough quantization, the intensity of the noise is too small in the quantization step. Therefore, an error easily occurs in the measurement result of the black level. In order to resolve this problem, the value of the adjustment reference signal is not a fixed value and a reference voltage containing a noise of an appropriate probability distribution is necessary. Since the adjustment reference signal contains the noise, the noise is excluded by performing the measurement a sufficient number of times and averaging the measured values and the correction process may be performed using the average value.

Figure 7:
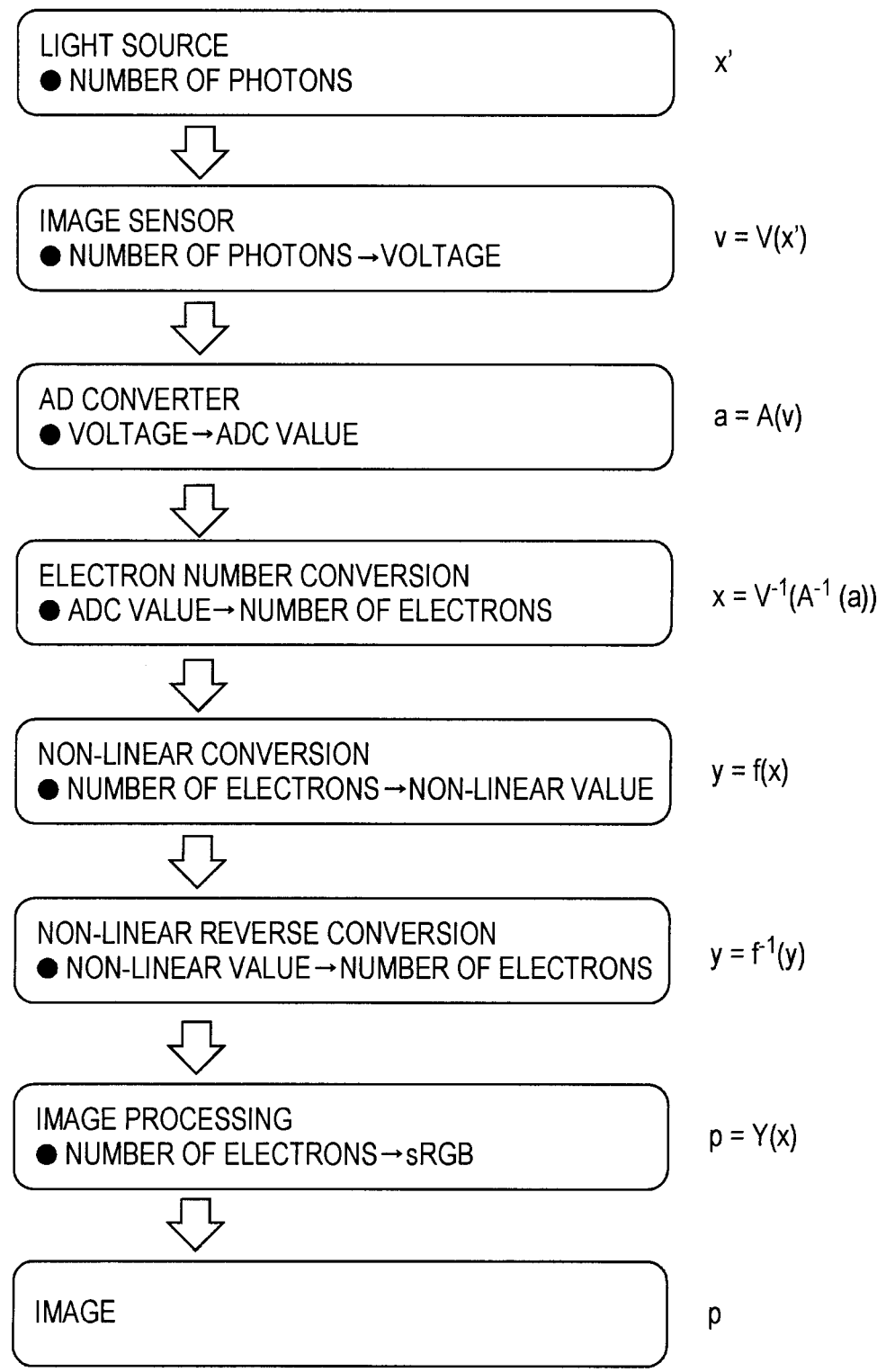
FIG. 7 is a diagram schematically illustrating the flow of signal processing from a case where a light source is input into an image sensor to a case where image data is acquired.

FIG. 7 is a diagram schematically illustrating a flow of signal processing from a case where a light source is input into an image sensor to a case where image data is acquired.

First, it is assumed that light with the number x' of photons is emitted from a light source. The image sensor converts the photons with the number x' of photons into electrons and further converts the electrons into a voltage v (see Expression 23 below). Then, the AD converter (ADC) converts the analog voltage value v into a digital value a (see Expression 24 below).

$$v = V(x') \quad (23)$$

$$a = A(v) \quad (24)$$

Then, in order to perform the non-linear quantization on the digital signal a, the digital signal a is first converted into the number x of electrons estimated to be generated by the image sensor according to Expression 25.

$$x = V^{-1}(A^{-1}(a)) \quad (25)$$

The number x of electrons is converted into a non-linear value y=f(x) using the above-described signal conversion expression 3 of using the beforehand calculated quantization step function r(x) before the removal of a noise (see Expression 26 below).

$$y = f(x) \quad (26)$$

The quantization step function r(x) before the removal of a noise is determined so that a difference between the expectation value of the non-quantized signal and the expectation value of the quantization signal is decreased. Accordingly, the RAW image signal can be compressed with small gray scales without the unnatural gray scale by the above-described signal conversion process.

Thereafter, when the number x of electrons is obtained from the non-linear value y by performing non-linear reverse conversion (see Expression 27 below), a sRGB signal Y(x) corresponding to the number x of electrons can be obtained using the predetermined tone curve Y(x) (see Expression 28 below). The sRGB is an IEC (International Electrotechnical Commission) standard in which a color representation of a CRT (Cathode Ray Tube) display is formulated as a base in a color space determined to ensure the reproducibility of colors in different environments.

$$x = f^{-1}(y) \quad (27)$$

$$p = Y(x) \quad (28)$$

Figure 8:
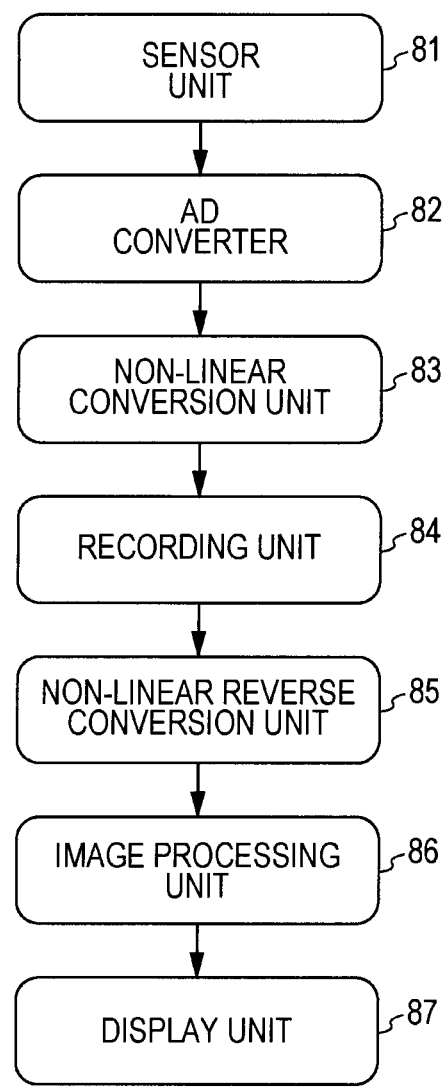
FIG. 8 is a functional block diagram schematically illustrating an exemplary configuration of a digital camera to which a signal conversion method is applied according to an embodiment of the invention.

FIG. 8 is a diagram schematically illustrating an exemplary functional configuration of a digital camera to which the above-described signal conversion method is applied. The illustrated digital camera is a camera that performs signal conversion according to Expression 5 before and after the RAW image is recorded. The digital camera includes a sensor unit 81, an AD converter (ADC) 82, a non-linear conversion unit 83, a recording unit 84, a non-linear reverse conversion unit 85, an image processing unit 86, and a display unit 87.

The sensor unit 81 is formed by an image sensor such as a CCD or a CMOS and converts the number of photons of incident light during exposure into a voltage signal. The AD converter 82 converts the voltage signal into a digital value.

The non-linear conversion unit 83 first converts the digital voltage signal into the number of electrons and performs non-linear conversion using the above-described signal conversion expression 5. As a consequence, the RAW image signal can be compressed to the smaller number of gray scales without generating the unnatural gray scale. The compressed RAW image signal is recorded in the recording unit 84. The compressed RAW image signal may be recorded in the recording unit 84, after the compressed RAW image is subjected to reversible compression of another arbitrary compression method or to irreversible compression of an arbitrary compression method in which the side effects such as the unnatural gray scale are few.

Thereafter, when the compressed RAW image signal is read from the recording unit 84 to display and output the recorded image, the non-linear reverse conversion unit 85 performs reverse conversion according to Expression 5 to obtain the RAW image signal corresponding to the number of electrons. However, when the compressed RAW image signal is subjected to another compression method such as reversible compression, the signal read from the recording unit 84 is restored, and then is processed by the non-linear reverse conversion unit 85. The image processing unit 86 performs gray scale correction by de-mosaic, white balance, and tone curve and a series of other image processing on the RAW image signal, and displays and outputs the result on a screen of the display unit 87.

Figure 9:
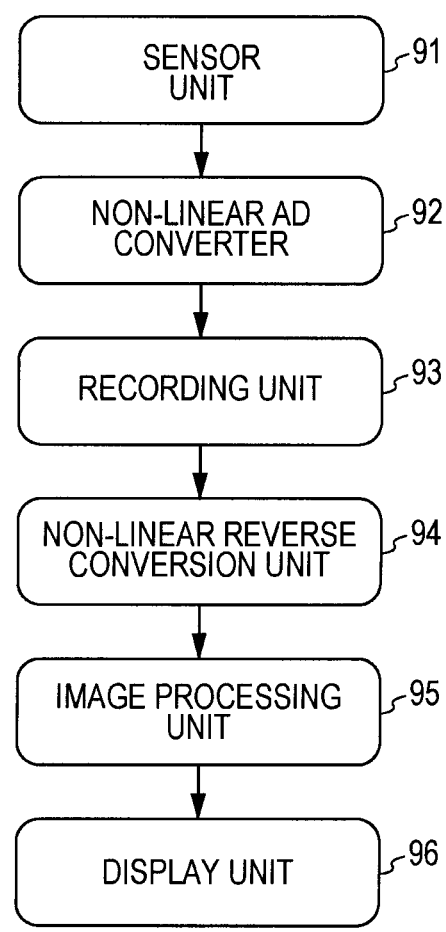
FIG. 9 is a functional block diagram schematically illustrating another exemplary configuration of the digital camera to which the signal conversion method is applied according to the embodiment of the invention.

FIG. 9 is a diagram schematically illustrating another exemplary functional configuration of the digital camera to which the above-described signal conversion method is applied. The illustrated digital camera is a camera in which in which the signal conversion process according to Expression 3 is performed on a reference voltage circuit in the non-linear AD converter. The digital camera includes a sensor unit 91, a non-linear AD converter (ADC) 92, a recording unit 93, a non-linear reverse conversion unit 94, an image processing unit 95, and a display unit 96.

The sensor unit 91 is formed by an image sensor such as a CCD or a CMOS and converts the number of photons of incident light during exposure into a voltage signal. The non-linear AD converter 92 performs non-linear conversion on the voltage signal using the above-described signal conversion expression 3, and converts the voltage signal into the compressed RAW image signal. As a consequence, the RAW image signal can be compressed to the smaller number of gray scales without generating the unnatural gray scale. The compressed RAW image signal is recorded in the recording unit 93. The compressed RAW image signal may be recorded in the recording unit 93, after the compressed RAW image is subjected to reversible compression of another arbitrary compression method or to irreversible compression of an arbitrary compression method in which the side effects such as the unnatural gray scale are few.

Thereafter, when the compressed RAW image signal is read from the recording unit 93 to display and output the recorded image, the non-linear reverse conversion unit 94 performs reverse conversion according to Expression 5 to obtain the RAW image signal corresponding to the number of electrons. However, when the compressed RAW image signal is subjected to another compression method such as reversible compression, the signal read from the recording unit 93 is restored, and then is processed by the non-linear reverse conversion unit 94. The image processing unit 95 performs gray scale correction by de-mosaic, white balance, and tone curve and a series of other image signal processing on the RAW image signal, and displays and outputs the result on a screen of the display unit 96.

Figure 10:
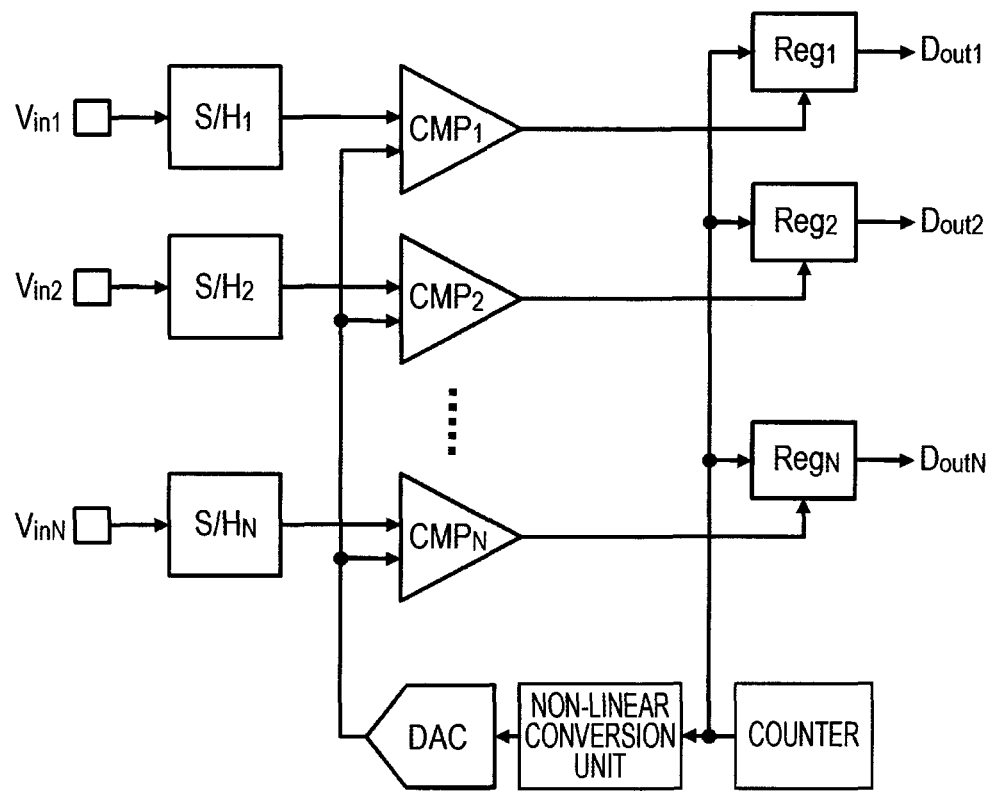
FIG. 10 is a diagram illustrating an exemplary internal configuration of a non-linear AD converter.

FIG. 10 is a diagram illustrating an exemplary internal configuration of the non-linear AD converter 92. The non-linear AD converter 92 has an N input and output parallel configuration. Sample hold circuits $S/H_1$, $S/H_2$, ..., and $S/H_N$ hold input voltage signals $V_{in1}$, $V_{in2}$, ..., and $V_{inN}$ for respective inputs and respectively input the input voltage signals to comparison circuits $CMP_1$, $CMP_2$, ..., and $CMP_N$ as one inputs. On the other hand, analog comparison signals converted by a DA converter (DAC) from the digital signals obtained through the non-linear conversion performed on values, which are counted by a counter, according to the non-linear function by the non-linear conversion unit are also input as reference voltages $V_{ref}$ to the comparison circuits $CMP_1$, $CMP_2$, ..., and $CMP_N$ as the other inputs. The counted values of the counter are held in registers $Reg_1$, $Reg_2$, ..., and $Reg_N$ of the respective bit positions, respectively. The output signals of the results compared by the comparison circuits $CMP_1$, $CMP_2$, ..., and $CMP_N$ are encoded in digital data $D_{out1}, D_{out2}, \ldots,$ and $D_{outN}$ whenever an input voltage signal is input and output, by enabling the output of the registers $Reg_1, Reg_2, \ldots,$ and $Reg_N$.

The configuration of the non-linear AD converter is not limited to the configuration shown in FIG. 10. Any converter may be used as long as the converter converts or replaces the digital linear characteristics of the inside of the converter into the non-linear characteristics. The circuit shown in FIG. 10 generates the non-linear analog comparison signal using the DA converter inputting the non-linear digital signal, but an analog circuit may be used to generate a non-linear analog comparison signal.

Figure 11:
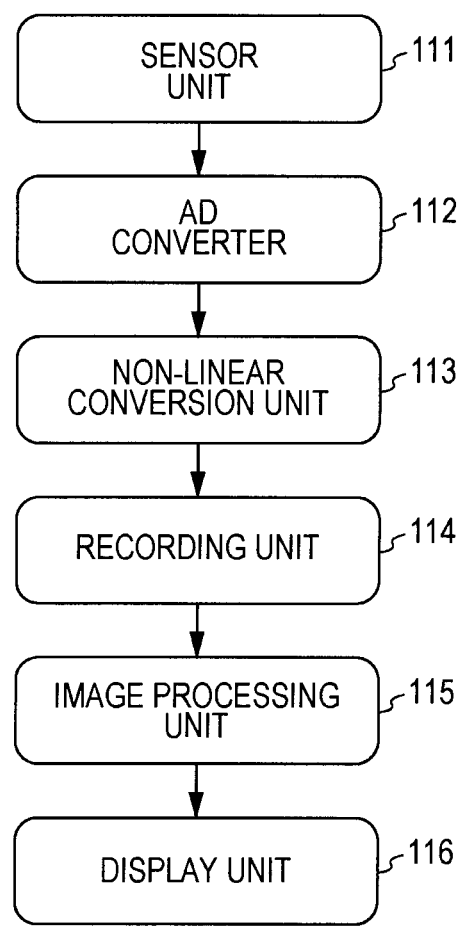
FIG. 11 is a functional block diagram schematically illustrating still another exemplary configuration of the digital camera to which the signal conversion method is applied according to the embodiment of the invention.

FIG. 11 is a diagram schematically illustrating still another exemplary functional configuration of the digital camera to which the above-described signal conversion method is applied. The illustrated digital camera performs signal conversion according to Expression 5 before the RAW image is recorded, and also performs the reverse conversion to the signal conversion during the image processing. The digital camera includes a sensor unit 111, an AD converter (ADC) 112, a non-linear conversion unit 113, a recording unit 114, an image processing unit 115, and a display unit 116.

The sensor unit 111 is formed by an image sensor such as a CCD or a CMOS and converts the number of photons of incident light during exposure into a voltage signal. The AD converter 112 converts the voltage signal into a digital value.

The non-linear conversion unit 113 first converts the digital voltage signal into the number of electrons and performs non-linear conversion using the above-described signal conversion expression 3. As a consequence, the RAW image signal can be compressed to the smaller number of gray scales without generating the unnatural gray scale. The compressed RAW image signal is recorded in the recording unit 114. The compressed RAW image signal may be recorded in the recording unit 114, after the compressed RAW image is subjected to reversible compression of another arbitrary compression method or to irreversible compression of an arbitrary compression method in which the side effects such as the unnatural gray scale are few.

Thereafter, the compressed RAW image signal is read from the recording unit 114 to display and output the recorded image. Here, when another compression method such as reversible compression is performed on the compressed RAW image signal, the signal read from the recording unit 114 is reversibly restored. The image processing unit 115 obtains the RAW image signal corresponding to the number of electrons by the reverse conversion according to Expression 5, performs gray scale correction by de-mosaic, white balance, and tone curve and a series of other image signal processing on the RAW image signal, and displays and outputs the result on a screen of the display unit 116.

Figure 12:
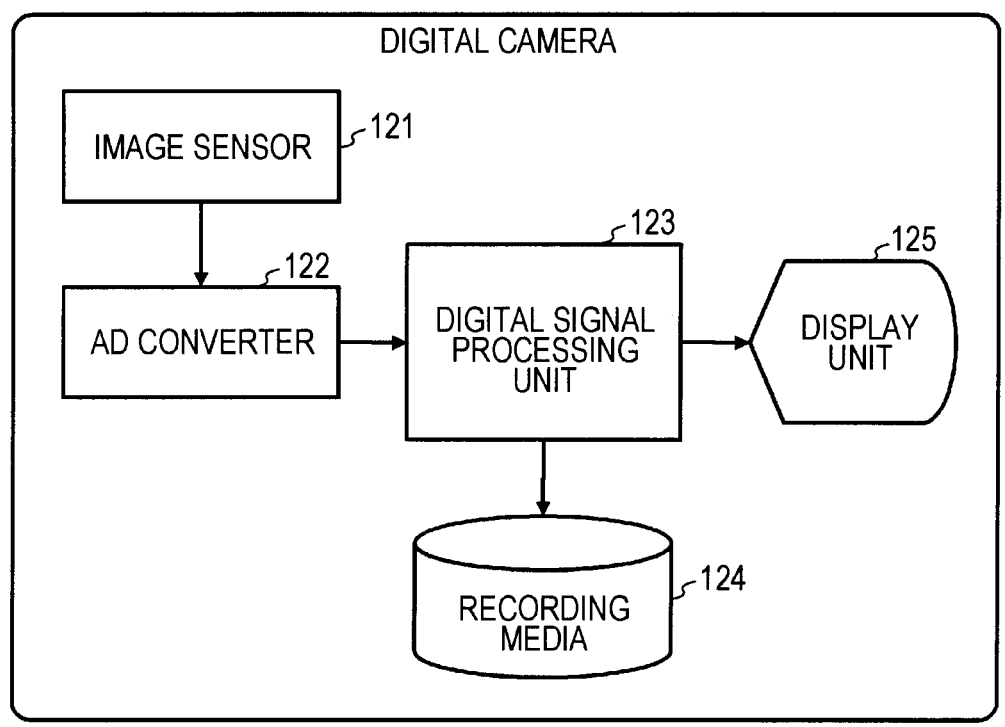
FIG. 12 is a diagram schematically illustrating an exemplary hardware configuration of a general digital camera.

FIG. 12 is a diagram schematically illustrating an exemplary hardware configuration of a general digital camera. The illustrated digital camera includes an image sensor 121, an AD converter (ADC) 122, a digital signal processing unit (DSP) 123, a recording media 124, and a display unit 125. The image sensor 121 is formed by an image capturing element such as a CCD or a CMOS. The digital signal processing unit 123 realizes the digital processes corresponding to those of the functional modules 83 to 86 shown in the block diagram illustrated in FIG. 8, those of the functional modules 93 to 95 shown in the functional block diagram illustrated in FIG. 9, and those of the functional modules 113 to 115 shown in the functional block diagram illustrated in FIG. 11.

The digital signal processing unit 123 includes a general arithmetic circuit or a register circuit storing values, a circuit dedicated for efficiently processing an image process, and an appropriate external I/O interface, and is connected to an internal memory circuit or an external memory circuit such as a DRAM or an SRAM, as necessary.

The hardware configuration of the digital camera is not limited to the configuration shown in FIG. 12. Although not illustrated, the digital camera includes a user interference such as a shutter button, a USB interface connected to a PC, a flashlight, and a focus mechanism or a diaphragm mechanism that are included in the functions of a general digital camera.

Figure 13:
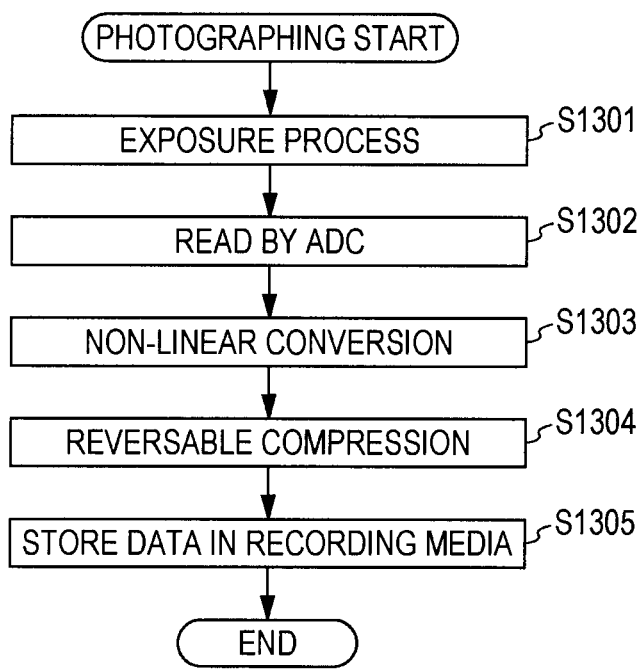
FIG. 13 is a flowchart illustrating the order of a photographing process performed in the digital camera shown in FIG. 12.

FIG. 13 is a flowchart illustrating the order of a photographing process performed in the digital camera shown in FIG. 12.

Photographing an image starts when the shutter button is pressed down. When an exposure process is first performed, a voltage signal corresponding to the number of photons of incident light is output from the image sensor 121 (step S1301). When the voltage signal converted into a digital value by the AD converter 122 is read (step S1302), the digital signal processing unit 123 first converts the digital voltage signal into the number of electrons and performs the non-linear conversion using the above-described signal conversion expression 3 (step S1303). As a result, invalid information with a noise level equal to or smaller than a noise level contained in the digital signal can be cut out. Accordingly, the RAW image signal can be compressed to the small number of gray scales without generating the unnatural gray scale.

Thereafter, the compressed RAW image signal is subjected to another compression such as reversible compression (step S1304), is recorded in the recording media 124 (step S1305), and then the process routine ends.

Figure 14:
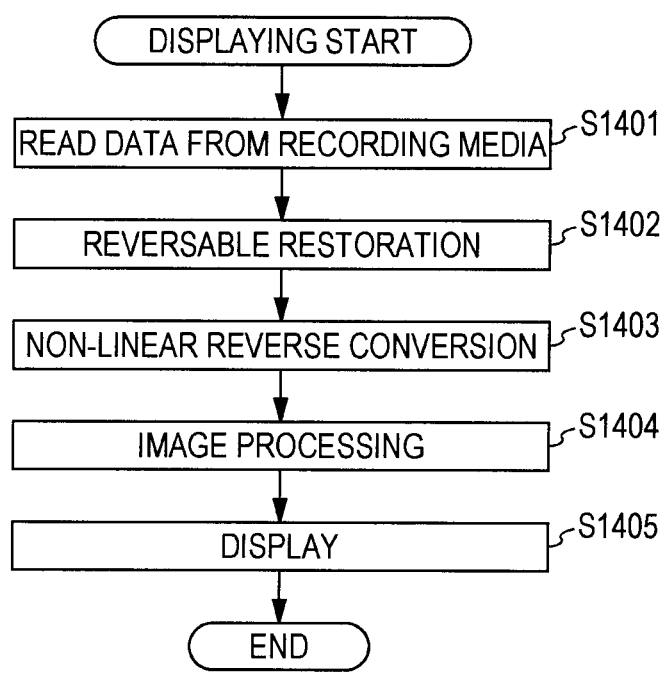
FIG. 14 is a flowchart illustrating the order of a display process performed in the digital camera shown in FIG. 12.
Figure 15:
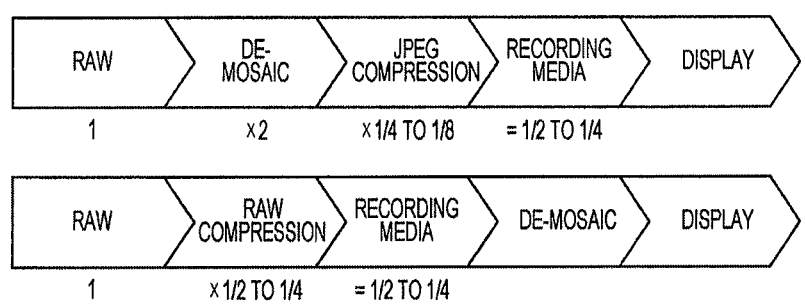
FIG. 15 is a diagram illustrating comparison between the processing orders of a JPEG image and a RAW image.
Figure 16A:
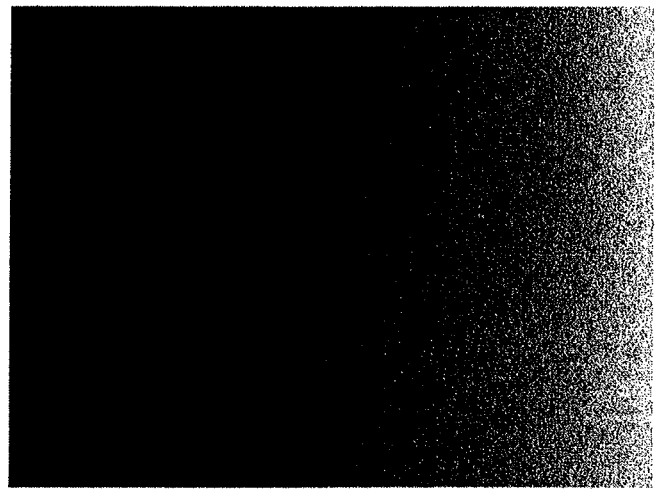
FIG. 16A is a diagram illustrating the result of the signal conversion by Expression 1 (where constant $c=½$).
Figure 16B:
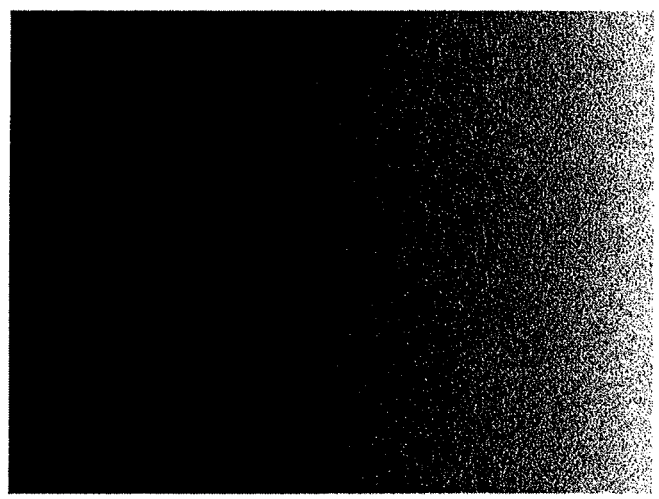
FIG. 16B is a diagram illustrating the result of the signal conversion by Expression 1 (where constant $c=⅓$).
Figure 16C:
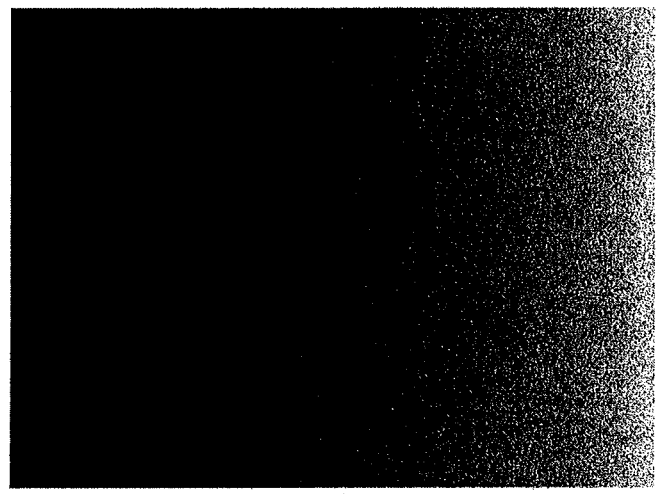
FIG. 16C is a diagram illustrating the result of the signal conversion by Expression 1 (where constant $c=¼$).
Figure 16D:
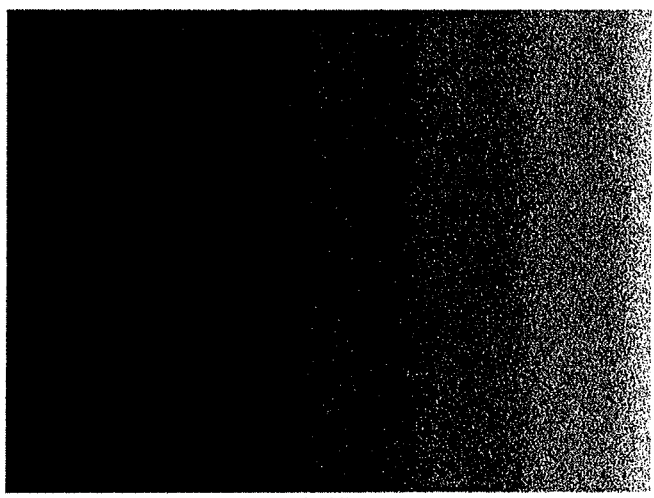
FIG. 16D is a diagram illustrating the result of the signal conversion by Expression 1 (where constant $c=⅛$).
Figure 17:
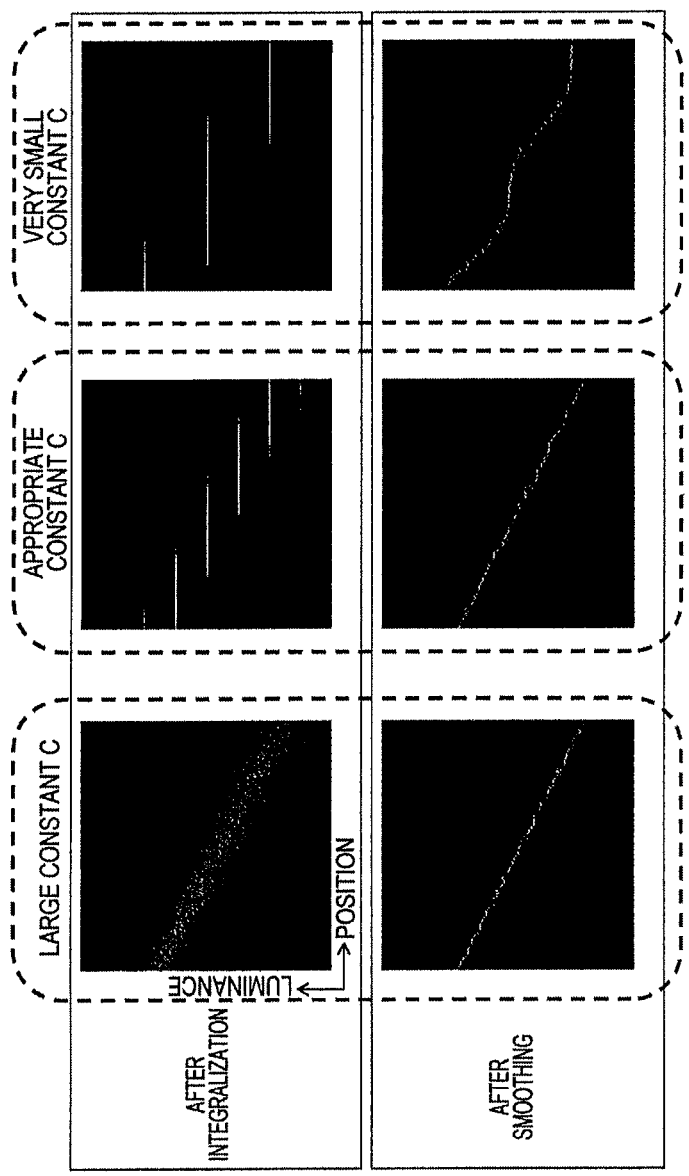
FIG. 17 is a diagram illustrating a luminance distribution in which an image sample varies from lightness to darkness with a change in the position when the image sample is subjected to integralization in a luminance direction and is further subjected to smoothing.

FIG. 14 is a flowchart illustrating the order of a display process performed in the digital camera shown in FIG. 12.

Displaying an image starts by operating the user interface. When first reading the RAW image signal compressed reversibly from the recording media 124 (step S1401), the digital signal processing unit 123 restores the compressed RAW image signal (step S1402).

Then, the digital signal processing unit 123 obtains the RAW image signal corresponding to the number of electrons by the reverse conversion according to Expression 7 (step S1403). The RAW image signal is subjected to the gray scale correction by de-mosaic, white balance, and tone curve and a series of other image signal processing (step S1404), and then are displayed and output on a screen of the display unit 125 (step S1405).

According to the embodiment of the invention, the signal conversion process can be performed in step S1303 based on the gray scales of the lightness of the image data obtained after development. Therefore, in step S1304, the RAW image can be compressed without generating the unnatural gray scale. In step S1303, the signal conversion process can be performed using the quantization step function (see Expressions 7 and 8) before the removal of a noise which is not dependent on experimental adjustment.

The present application contains subject matter related to that disclosed in Japanese Priority Patent Application JP 2009-247224 filed in the Japan Patent Office on Oct. 28, 2009, and Japanese Priority Patent Application JP 2010-192141 filed in the Japan Patent Office on Aug. 30, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal conversion apparatus which converts an input signal x from an image sensor into an output signal y by a function relation represented by Expression 1:

$$y = f(x) = \int_b^x [1/r(\xi)]d\xi \qquad (1)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

2. The signal conversion apparatus according to claim 1, wherein the input signal x is a signal voltage corresponding to the number of electrons depending on lightness, b is a signal voltage when the lightness is 0, a standard deviation of the noise superimposed in the input signal x is dependent on the value of the input signal x.

3. The signal conversion apparatus according to claim 1, wherein the output signal y is a digital signal quantized so that LSB corresponds to 1, and wherein the function r(x) is a function determining Expression 1 so that a difference between an expectation value of a non-quantized signal and an expectation value of a quantized signal is decreased.

4. The signal conversion apparatus according to claim 1, wherein a function r(x) represented by Expression 2 is obtained under a constraint condition represented by Expression 3:

$$r(x) = \max_{p \in R} r(x; p); \qquad (2)$$

and $$\left| E\left\{ \left\lfloor \frac{x+N(x)}{r(x)} + p \right\rfloor + 0.5 - p \right\} r(x) - x \right| < R(x) \qquad (3)$$

where R(x) is a quantization step function after the noise of the input signal x determining the increment of the input signal x to an increment of a gray scale of image data from which a noise is removed by a development process, E(•) is a functional indicating an expectation value, p is a disturbance value, and N(x) is a random variable indicating the noise with an average value of 0 which is contained in the input signal x.

5. The signal conversion apparatus according to claim 4, wherein the function R(x) is obtained based on a tone curve Y(x) used in a subsequent image process:

$$R(x) = \frac{1}{\frac{dY(x)}{dx}}. \qquad (4)$$

6. The signal conversion apparatus according to claim 4, wherein the function r(x) in Expression 2 is substituted by Expression 5:

$$r(x) = \min(r'(x), q(x)) \qquad (5)$$

where r'(x) is r(x) in Expression 2 and q(x) is a predetermined function.

7. The signal conversion apparatus according to claim 6, wherein the function q(x) in Expression 5 is represented by Expression 6:

$$q(x) = n(x)/c \qquad (6)$$

where n(x) is a function indicating an intensity of the noise depending on an intensity of the signal and c is a predetermined constant.

8. A signal conversion method of converting, with a signal conversion apparatus, an input signal x from an image sensor into an output signal y by a function relation represented by Expression 7:

$$y = f(x) = \int_b^x [1/r(\xi)]d\xi \qquad (7)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

9. A non-transitory, computer-readable medium comprising instructions causing a computer to convert an input signal x from an image sensor into an output signal y by a function relation represented by Expression 8:

$$y = f(x) = \int_b^x [1/r(\xi)]d\xi, \qquad (8)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

10. An image processing apparatus comprising:

a signal processing unit which converts a digital voltage signal a=A(v), which is obtained through digital conversion performed on a voltage signal v=V(x) including a signal voltage corresponding to the number x of photons output from an image sensor, into the number $x=V^{-1}(A^{-1}(a))$ of electrons generated in the image sensor, and which then performs non-linear conversion k=f(x) by a function relation represented by Expression 9 and performs non-linear reverse conversion to the number $x=V^{-1}(k)$ of electrons; and an image processing unit which obtains an image signal y=Y(x) by performing an image process other than demosaic on a RAW image signal including the number x of electrons subjected to the non-linear reverse conversion, using a predetermined tone curve Y(x):

$$y = f(x) = \int_b^x [1/r(\xi)]d\xi, \qquad (9)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

11. An image capturing apparatus comprising:
a sensor unit converting the number x of photons of incident light into a voltage signal;
an AD converter converting the voltage signal into a digital value;
a non-linear conversion unit performing non-linear conversion to convert the number x of electrons corresponding to a digital voltage signal by a function relation represented by Expression 10;
a recording unit recording a digital non-linear signal y;
a non-linear reverse conversion unit performing reverse conversion on the digital non-linear signal y to obtain a RAW image signal corresponding to the number x of electrons;
an image processing unit performing an image process other than de-mosaic on the RAW image signal using a predetermined tone curve Y(x) to obtain an image signal y=Y(x); and
a display unit displaying and outputting the image signal y:

$$y = f(x) = \int_b^x [1/r(\xi)]d\xi, \qquad (10)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

12. An image capturing apparatus comprising:
a sensor unit converting the number x of photons of incident light into a voltage signal;
a non-linear AD converter performing non-linear conversion to convert the number x of electrons corresponding to the voltage signal by a function relation represented by Expression 11 and converting the number x of electrons into a digital value;
a recording unit recording a digital non-linear signal y;
a non-linear reverse conversion unit performing reverse conversion on the digital non-linear signal y to obtain a RAW image signal corresponding to the number x of electrons;
an image processing unit performing an image process other than de-mosaic on the RAW image signal using a predetermined tone curve Y(x) to obtain an image signal y=Y(x); and
a display unit displaying and outputting the image signal y:

$$y = f(x) = c\int_b^x [1/r(\xi)]d\xi, \qquad (11)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

13. An image capturing apparatus comprising:
a sensor unit converting the number of photons of incident light into a voltage signal;
an AD converter converting the voltage signal into a digital value;
a non-linear conversion unit performing non-linear conversion to convert the number x of electrons corresponding to a digital voltage signal by a function relation represented by Expression 12;
a recording unit recording a digital non-linear signal y;
an image processing unit performing reverse conversion on the digital non-linear signal y to obtain a RAW image signal corresponding to the number x of electrons and performing an image process other than de-mosaic using a predetermined tone curve Y(x) to obtain an image signal y=Y(x); and
a display unit displaying and outputting the image signal y:

$$y = f(x) = c\int_b^x [1/r(\xi)]d\xi, \qquad (12)$$

where b is a predetermined constant, $\xi$ is an integration variable corresponding to a value of the input signal x, and $r(\xi)$ is a quantization step function before removal of a noise of the input signal x, which determines an increment of the input signal x to an increment of the output signal y.

* * * * *